United States Patent
Iwasaki et al.

(10) Patent No.: US 9,471,714 B2
(45) Date of Patent: Oct. 18, 2016

(54) METHOD FOR INCREASING THE SECURITY LEVEL OF A USER DEVICE THAT IS SEARCHING AND BROWSING WEB PAGES ON THE INTERNET

(75) Inventors: Narutaka Iwasaki, Shinagawa-ku (JP); Yu Hirate, Shinagawa-ku (JP)

(73) Assignee: Rakuten, Inc., Tokyo (JP)

( * ) Notice: Subject to any disclaimer, the term of this patent is extended or adjusted under 35 U.S.C. 154(b) by 204 days.

(21) Appl. No.: 13/824,475

(22) PCT Filed: Sep. 28, 2011

(86) PCT No.: PCT/JP2011/072232
§ 371 (c)(1),
(2), (4) Date: Mar. 18, 2013

(87) PCT Pub. No.: WO2012/043650
PCT Pub. Date: Apr. 5, 2012

(65) Prior Publication Data
US 2013/0185320 A1   Jul. 18, 2013

(30) Foreign Application Priority Data

Sep. 29, 2010   (JP) ................................ 2010-218755

(51) Int. Cl.
*G06F 17/30* (2006.01)
*G06F 17/22* (2006.01)
*G06F 21/62* (2013.01)

(52) U.S. Cl.
CPC ..... *G06F 17/30985* (2013.01); *G06F 17/2235* (2013.01); *G06F 17/30873* (2013.01); *G06F 17/30905* (2013.01); *G06F 21/6209* (2013.01)

(58) Field of Classification Search
CPC ........... H04L 63/1483; H04L 63/1441; G06F 17/2235; G06F 17/30873; G06F 17/30905; G06F 17/30985
USPC ............................ 707/758, E17.116; 726/22
See application file for complete search history.

(56) References Cited

U.S. PATENT DOCUMENTS

| 2007/0011739 | A1* | 1/2007 | Zamir ..................... G06F 21/50 726/22 |
| 2008/0092242 | A1* | 4/2008 | Rowley .......................... 726/27 |

(Continued)

FOREIGN PATENT DOCUMENTS

| JP | 2006-106928 A | 4/2006 |
| JP | 2007-156690 A | 6/2007 |

(Continued)

*Primary Examiner* — Phong Nguyen
(74) *Attorney, Agent, or Firm* — Sughrue Mion, PLLC

(57) ABSTRACT

A character string which is set in advance is stored (S4), and display data are obtained (S5), and link information is extracted from the obtained display data (S9), and a partial link character string is generated from the extracted link information (S10), and similarity of the character string and the partial link character string is calculated (S11), and a determination is made as to whether the link information is similar link information on the basis of the calculated similarity (S12), and when the link information is determined to be the similar link information, a display position 42 where the extracted link information is displayed is specified, and a display area (43, 44) for displaying existence information indicating existence of the similar link information is specified on the basis of the specified display position (S13), and the existence information indicating existence of the similar link information is displayed in the specified display area (S15).

19 Claims, 13 Drawing Sheets

(56) References Cited

U.S. PATENT DOCUMENTS

| | | | |
|---|---|---|---|
| 2008/0115214 A1* | 5/2008 | Rowley | G06F 21/6209 726/22 |
| 2009/0248494 A1* | 10/2009 | Hueter | G06Q 10/00 705/7.29 |
| 2010/0043071 A1* | 2/2010 | Wang | 726/22 |
| 2010/0095375 A1* | 4/2010 | Krishnamurthy | G06F 17/30864 726/22 |
| 2010/0154055 A1* | 6/2010 | Hansen | G06F 21/6218 726/22 |
| 2011/0119248 A1* | 5/2011 | Abe | G06F 17/30867 707/710 |
| 2013/0067545 A1* | 3/2013 | Hanes | H04L 9/3231 726/6 |

FOREIGN PATENT DOCUMENTS

| | | |
|---|---|---|
| JP | 2008310772 A | 12/2008 |
| JP | 2009-060354 A | 3/2009 |
| JP | 2009-515230 A | 4/2009 |
| JP | 2010-171471 A | 8/2010 |
| WO | 2007/000751 A2 | 1/2007 |

* cited by examiner

METHOD FOR INCREASING THE SECURITY LEVEL OF A USER DEVICE THAT IS SEARCHING AND BROWSING WEB PAGES ON THE INTERNET

CROSS REFERENCE TO RELATED APPLICATIONS

This application is a National Stage of International Application No. PCT/JP2011/072232 filed Sep. 28, 2011, claiming priority based on Japanese Patent Application No. 2010-218755 filed Sep. 29, 2010, the contents of all of which are incorporated herein by reference in their entirety.

TECHNICAL FIELD

The present invention relates to a technical field of a display program, a display apparatus, an information processing method, a recording medium, and an information processing apparatus for displaying information on a web page.

BACKGROUND ART

On the Internet, there are confusing, similar web sites, which are attempting free ride on famous sites. On the other hand, there occurs phishing fraud, which tries to obtain information such as a password by leading a user while disguising as an authentic mail or web site.

Under such circumstances, various kinds of countermeasure methods are done to warn users in order to protect users. For example, Patent Document 1 discloses a phishing fraud countermeasure method including analyzing a mail that has been received, extracting a company name and a URL (Uniform Resource Locator) included in the mail, extracting a company that is closely related to the URL from position relationship between the company name and the URL in the mail for each of the extracted URLs, thereby outputting a corresponding company ID, and verifying authenticity of the site indicated by the URL on the basis of a white list describing a company and a URL of an authentic site corresponding to the company and whether or not a URL selected by looking up the URL white list, where any one of the URLs is selected, is described in the URL white list as the URL corresponding to the company indicated by the company ID.

CITATION LIST

Patent Document

Patent Document 1: Japanese Patent Application Laid-Open No. 2007-156690

SUMMARY OF THE INVENTION

Problem to be Solved by the Invention

However, among web sites, there are many web sites which cannot be simply classified into either a white list or a black list. Even if it is the web site that cannot be classified, or in some cases, even a web site that belongs to the white list, it may be difficult for a user to determine whether it is the web site that the user is to access before accessing the web site by only checking the URL, and therefore, sometimes the user may access an incorrect web site. For phishing fraud countermeasure and the like which change every day, it is necessary to update the white list and the black list at all times under the management of the side of the server, and on every such occasion, the update needs to be reflected, which is troublesome for the user. In the above conventional technique, it is difficult to effectively prevent a user from accessing and viewing a confusing web site.

The present invention is made in view of such problems, and it is an example of object to provide a display program, a display apparatus, an information processing method, a recording medium, and an information processing apparatus capable of preventing a user from accessing or viewing, by mistake, a confusing web site including a similar character string in a site name, a URL, and the like.

Means for Solving the Problem

In order to solve the above problem, the invention according to an exemplary embodiment causes a computer to execute a character string storing step of storing a character string which is set in advance, a display data obtaining step of obtaining display data, a link information extracting step of extracting link information from the obtained display data, a partial link character string generating step of generating a partial link character string from the extracted link information, a similarity calculating step of calculating similarity of the character string and the partial link character string, a similarity determining step of determining whether the link information is similar link information or not on the basis of the calculated similarity, a display position specifying step of specifying a display position where the extracted link information is displayed, when the link information is determined to be the similar link information in the determining step, a display area specifying step of specifying a display area for displaying existence information indicating existence of the similar link information on the basis of the specified display position, and an existence information display step of displaying the existence information indicating existence of the similar link information in the specified display area.

In the display program according to an exemplary embodiment, is characterized in that in the partial link character string generating step, the partial link character string is generated by dividing the link information with a character set in advance.

In the display program according to an exemplary embodiment is characterized in that in the partial link character string generating step, the partial link character string is generated by dividing the link information with a predetermined number of characters.

In the display program according to an exemplary embodiment, is characterized in that the invention according to claim 4 further includes a character string setting step of setting the character string.

In the display program according to an exemplary embodiment is characterized in that in the character string setting step, a character string included in web page specifying information for specifying a location where a web page accessed with a web browser exists is set as the character string.

In the display program according to an exemplary embodiment is characterized in that the invention according to claim 6 further includes an access number storing step of storing a number of times of accesses for each web page, wherein, in the character string setting step, the number of times a web page is accessed with the web browser is obtained, and on the basis of comparison between the number of times of accesses and a threshold value set in advance, the character string included in web page specifying information for specifying a location where the web page exists is set as the character string.

In the display program according to an exemplary embodiment, is characterized in that the invention according to claim 7 further includes a search step of receiving input of a search keyword, obtaining a search result in response to the search keyword, and displaying the search result.

In the display program according to an exemplary embodiment, is characterized in that in the character string storing step, a specifying character string determined to be similar in the similarity determining step is stored, and in the similarity determining step, when the link information is determined to include the specifying character string, the link information is determined to be similar link information.

In the display program according to an exemplary embodiment, is characterized in that in the character string storing step, a non-similar character string determined not to be similar in the similarity determining step is stored, and in the similarity determining step, when the link information is determined to include the non-similar character string, the link information is determined not to be similar link information.

The invention according to an exemplary embodiment includes a character string storing means that stores a character string which is set in advance, a display data obtaining means that obtains display data, a link information extracting means that extracts link information from the obtained display data, a partial link character string generating means that generates a partial link character string from the extracted link information, a similarity calculating means that calculates similarity of the character string and the partial link character string, a similarity determining means that determines whether the link information is similar link information or not on the basis of the calculated similarity, a display position specifying means that specifies a display position where the extracted link information is displayed, when the link information is determined to be the similar link information by the determining means, a display area specifying means that specifies a display area for displaying existence information indicating existence of the similar link information on the basis of the specified display position, and an existence information display means that displays the existence information indicating existence of the similar link information in the specified display area.

The invention according to an exemplary embodiment is an information processing method for an information processing apparatus for performing information processing for displaying information, and the information processing method includes a character string storing step of storing a character string which is set in advance, a display data obtaining step of obtaining display data, a link information extracting step of extracting link information from the obtained display data, a partial link character string generating step of generating a partial link character string from the extracted link information, a similarity calculating step of calculating similarity of the character string and the partial link character string, a similarity determining step of determining whether the link information is similar link information or not on the basis of the calculated similarity, a display position specifying step of specifying a display position where the extracted link information is displayed, when the link information is determined to be the similar link information in the determining step, a display area specifying step of specifying a display area for displaying existence information indicating existence of the similar link information on the basis of the specified display position, and a display data generating step of generating display data in which the existence information indicating existence of the similar link information is displayed in the specified display area.

The invention according to an exemplary embodiment is a computer-readable recording medium recorded with an information processing program for causing a computer to execute a character string storing step of storing a character string which is set in advance, a display data obtaining step of obtaining display data, a link information extracting step of extracting link information from the obtained display data, a partial link character string generating step of generating a partial link character string from the extracted link information, a similarity calculating step of calculating similarity of the character string and the partial link character string, a similarity determining step of determining whether the link information is similar link information or not on the basis of the calculated similarity, a display position specifying step of specifying a display position where the extracted link information is displayed, when the link information is determined to be the similar link information in the determining step, a display area specifying step of specifying a display area for displaying existence information indicating existence of the similar link information on the basis of the specified display position, and a display data generating step of generating display data in which the existence information indicating existence of the similar link information is displayed in the specified display area.

The invention according to an exemplary embodiment includes a character string storing means that stores a character string which is set in advance, a display data obtaining means that obtains display data, a link information extracting means that extracts link information from the obtained display data, a partial link character string generating means that generates a partial link character string from the extracted link information, a similarity calculating means that calculates similarity of the character string and the partial link character string, a similarity determining means that determines whether the link information is similar link information or not on the basis of the calculated similarity, a display position specifying means that specifies a display position where the extracted link information is displayed, when the link information is determined to be the similar link information by the determining means, a display area specifying means that specifies a display area for displaying existence information indicating existence of the similar link information on the basis of the specified display position, a display data generating means that generates display data in which the existence information indicating existence of the similar link information is displayed in the specified display area, and a transmission means that transmits the display data generated by the display data generating means.

Effect of the Invention

According the present invention, the character string which is set in advance is stored, and display data are obtained, and link information is extracted from the obtained display data, and a partial link character string is generated from the extracted link information, and similarity of the character string and the partial link character string is calculated, and a determination is made as to whether the link information is similar link information on the basis of the calculated similarity, and when the link information is determined to be the similar link information, a display position where the extracted link information is displayed is specified, and a display area for displaying existence information indicating existence of the similar link information is specified on the basis of the specified display position, and the existence information indicating existence of the similar link information is displayed in the specified display area, thus preventing a user from accessing or viewing, by mistake, a confusing web site including a similar character string in a site name, a URL, and the like.

MODES FOR CARRYING OUT THE INVENTION

Hereinafter, embodiments of the present invention will be explained with reference to drawings. In addition, the embodiments explained below are embodiments where the present invention is applied to a display system.

[1. Overview of Configuration and Function of Display System]

First, the configuration and general functions of the display system according to an embodiment of the present invention will be explained FIG. 1.

Figure 1:
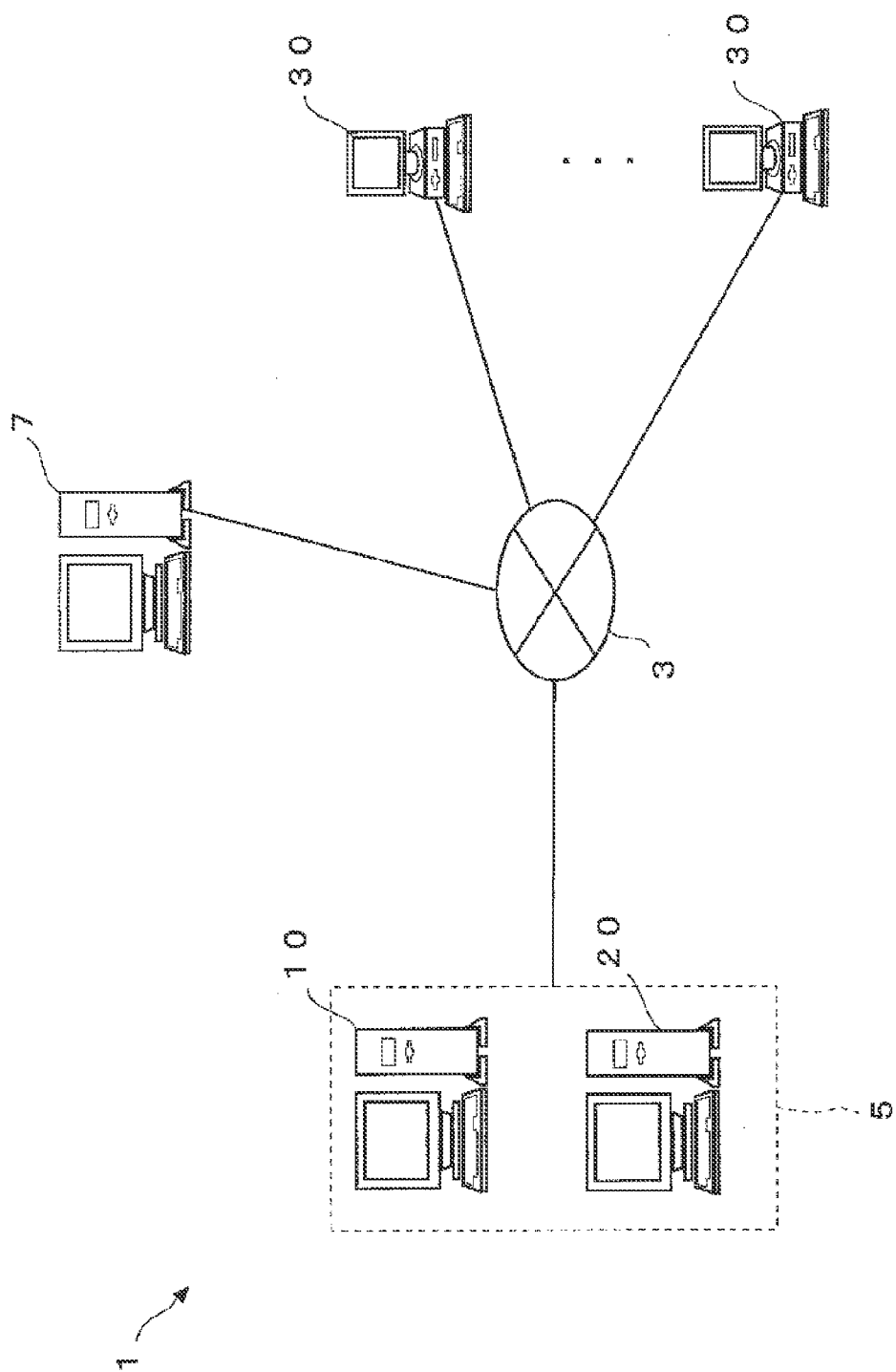
FIG. 1 is a schematic view illustrating an example of configuration of overview of a display system according to an embodiment of the present invention.

FIG. 1 is a schematic view illustrating an example of configuration of overview of a display system 1 according to the present embodiment.

As illustrated in FIG. 1, the display system 1 includes a tool bar providing server 10 which provides a tool bar having a search function and the like, an information providing server 20 which is installed to run a shopping site used by users and which provides information about products and the like to users, and a terminal 30 (an example of display apparatus) which, for examples, displays a search result and the like using the tool bar and displays information in a web page.

The tool bar providing server 10 and the information providing server 20 are connected via a local area network and the like, and are configured to be able to transmit and receive data with each other, and the tool bar providing server 10 and the information providing server 20 constitute the server system 5. Further, the server system 5 and the terminal 30 are connected via a network 3, and are configured to transmit and receive data by communication protocol (for example, TCP/IP). In addition, the network 3 is established by, for example, the Internet, dedicated communication lines (for example, CATV line (Community Antenna Television) network), mobile communication networks (including base stations and the like), gateways, and the like.

The tool bar providing server 10 and the terminal 30 are connected via the network 3 to the search server 7. The search server 7 has a search database (not shown), and functions as a search engine on the Internet for searching on the basis of a search query given by the terminal 30.

The tool bar providing server 10 provides a tool bar and the like to the terminal 30 and the like.

The terminal 30 includes a web browser and a tool bar (an example of a display program) incorporated into a web browser. The terminal 30 transmits the search query of the tool bar to the search server 7, and displays a search result and advertisement on the screen of the web browser. Further, when there is a similar link to a particular link which overlaps a search result and the like, the terminal 30 displays information about a mark and the like indicating existence of the similar link.

[2. Configuration and Function of Each Server]

(2.1 Configuration and Function of Tool Bar Providing Server 10)

Next, the configuration and function of the tool bar providing server 10 will be explained FIG. 2.

Figure 2:
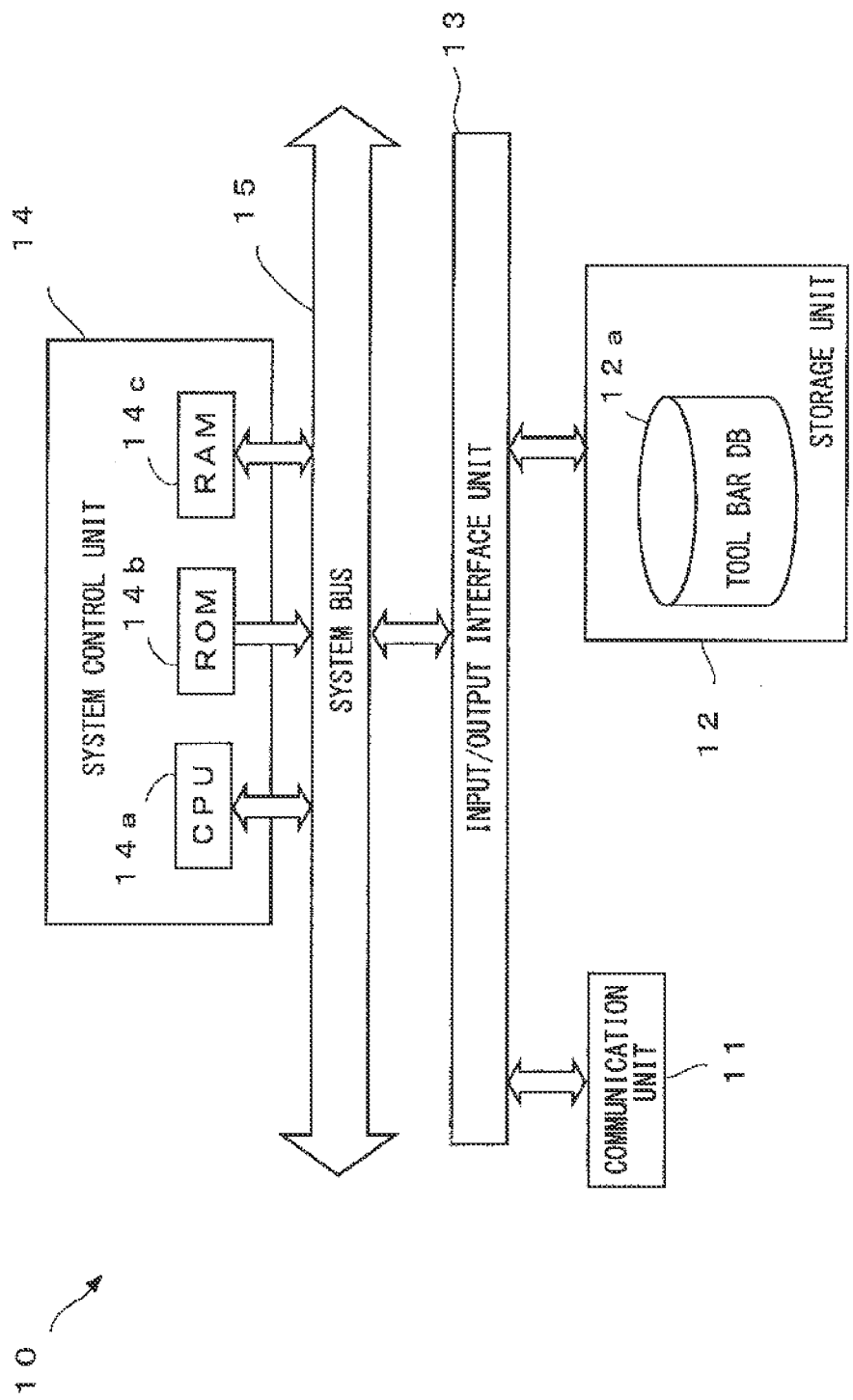
FIG. 2 is a block diagram illustrating an example of configuration of overview of a tool bar providing server of FIG. 1.

FIG. 2 is a block diagram illustrating an example of configuration of overview of the tool bar providing server 10.

As illustrated in FIG. 2, the tool bar providing server 10 functioning as a computer includes a communication unit 11, a storage unit 12, an input/output interface unit 13, and a system control unit 14. Further, the system control unit 14 and the input/output interface unit 13 are connected via a system bus 15.

The communication unit 11 is connected to the network 3, and controls the communication state with the terminal 30 and the like, and further, the communication unit 11 is connected to a local area network, and exchanges data with another server such as the information providing server 20 and the like on the local area network.

The storage unit 12 is constituted by, for example, a hard disk drive, and stores various kinds of programs and data such as an operating system and server programs. In addition, for example, various kinds of programs may be configured to be obtained by way of the network 3 from another server apparatus and the like, or alternatively, various kinds of programs may be configured to be recorded to a recording medium, and may be read by a means of a drive apparatus (not shown).

In the storage unit 12, a tool bar database (DB) 12a (hereinafter referred to as "tool bar DB") and the like are structured.

The tool bar DB 12a stores a program of the tool bar incorporated into a web browser. In addition, the tool bar will be explained later.

Next, the input/output interface unit 13 performs interface processing between the communication unit 11 and storage unit 12 and the system control unit 14.

The system control unit 14 includes, for example, a CPU (Central Processing Unit) 14a, a ROM (Read Only Memory) 14b, and a RAM (Random Access Memory) 14c. In the system control unit 14, the CPU 14a reads and executes various kinds of programs stored in the ROM 14b and the storage unit 12, whereby the system control unit 14 performs, e.g., processing for transmitting the program and the like of the tool bar to the terminal 30 and the like.

(2.2 Configuration and Function of Information Providing Server 20)

Next, the configuration and function of the information providing server 20 will be explained FIG. 3.

Figure 3:
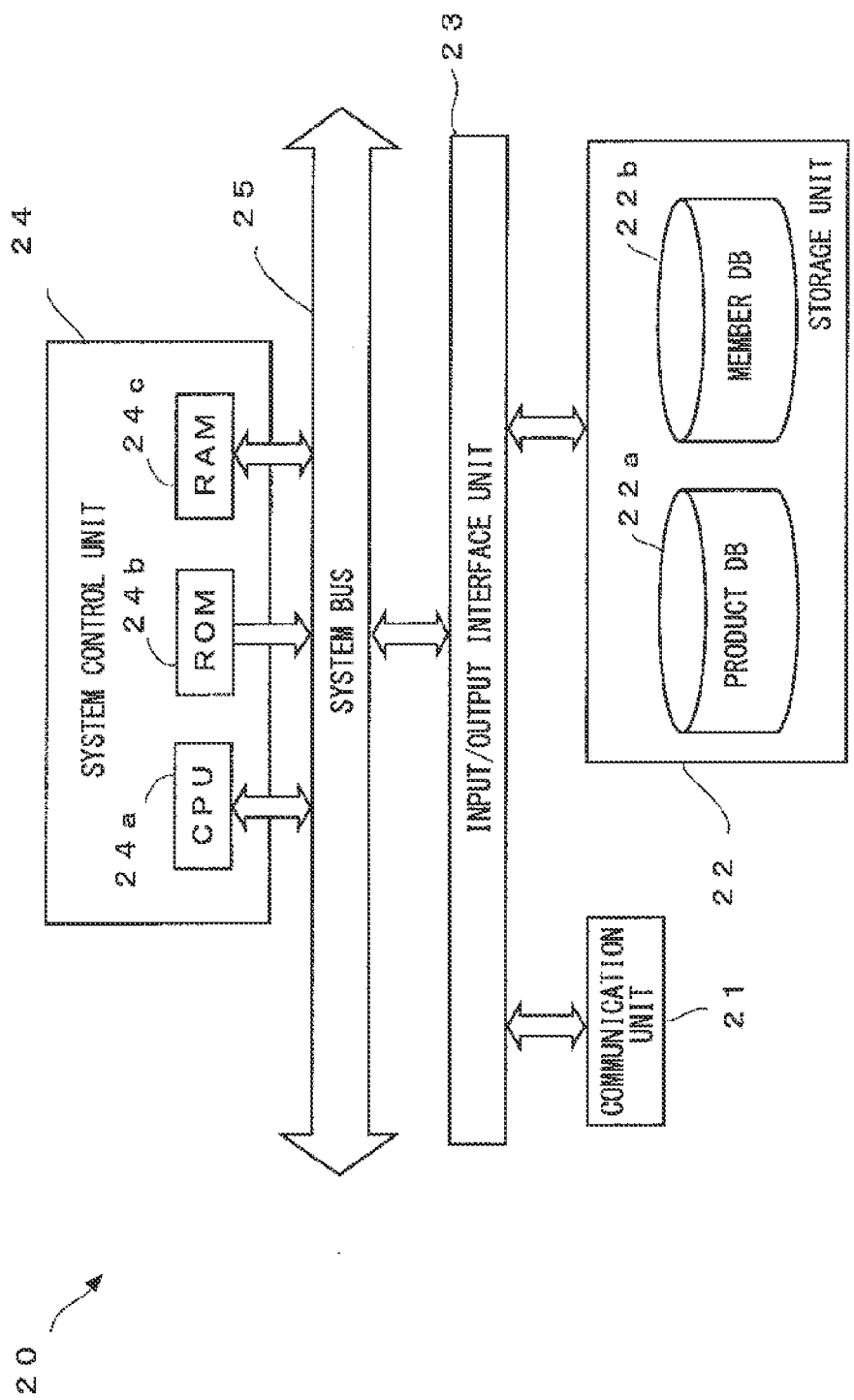
FIG. 3 is a block diagram illustrating an example of configuration of overview of providing of information of FIG. 1.

FIG. 3 is a block diagram illustrating an example of configuration of overview of the information providing server 20.

As illustrated in FIG. 3, the information providing server 20 includes a communication unit 21, a storage unit 22, an input/output interface unit 23, and a system control unit 24, and the system control unit 24 and the input/output interface unit 23 are connected via a system bus 25. In addition, the configuration and function of the information providing server 20 are substantially the same as the configuration and function of the tool bar providing server 10, and accordingly, different features of each configuration and each function of the tool bar providing server 10 will be mainly explained.

For example, the communication unit 21 controls the communication state with the terminal 30, the tool bar providing server 10, and the like via the network 3 and local area network, and the like.

In the storage unit 22, for example, a product database (hereinafter referred to as "product DB) 22a and a member database (hereinafter referred to as "member DB) 22b are structured.

In association with a product ID which is an identifier for identifying a product, the product DB 22a stores the product name, the type, an image of the product, specifications, and product information, and also advertisement information and the like about each product. The product DB 22a also stores, for example, a file of a product web page described in a markup language and the like such as HTML (Hyper Text Markup Language) and XML (Extensible Markup Language).

The member DB 22b registers user information such as user ID, name, address, phone number, mail address, occupation, hobby, purchase history of a user (user of a shopping site) registered as a member, and theme or genre in which the user is interested. Further, the member DB 22b stores a user ID, a login ID, and a password which are required when the user logs into the shopping site using the terminal 30. Here, the login ID and the password are login information used in login processing (user's authentication processing).

The system control unit 24 includes a CPU 24a, a ROM 24b, a RAM 24c, and the like. In the system control unit 24, the CPU 24a reads and executes various kinds of program stored in the ROM 24b and the storage unit 22, and for example, records user's product purchase processing and purchase history of products for each user ID.

(2.3 Configuration and Function of Terminal 30)

Next, the configuration and function of the terminal 30 will be explained FIG. 4.

Figure 4:
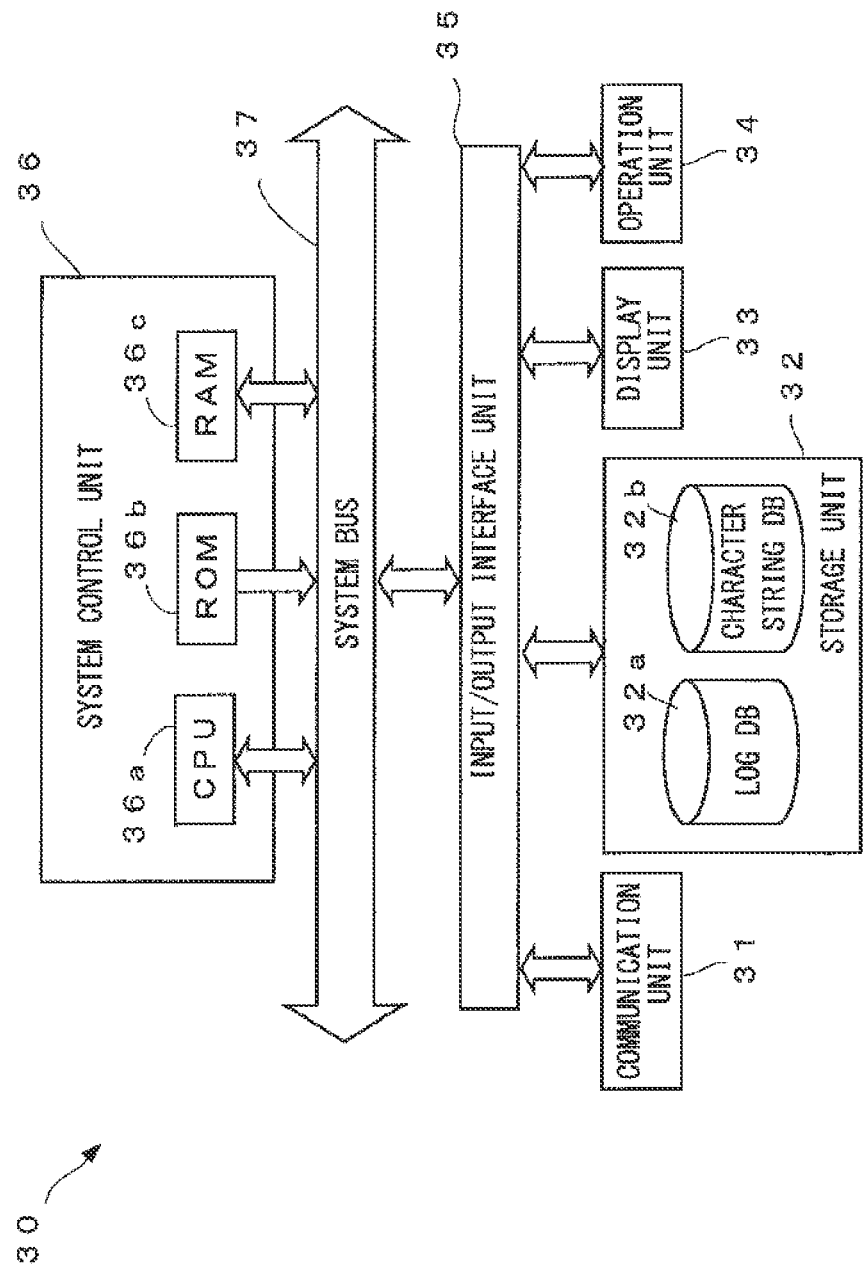
FIG. 4 is a block diagram illustrating an example of configuration of overview of the terminal of FIG. 1.

FIG. 4 is a block diagram illustrating an example of configuration of overview of the terminal 30.

As illustrated in FIG. 4, the terminal 30 functioning as a computer is, for example, a portable terminal such as portable radio phones and PDAs including a personal computer or a smartphone, and includes a communication unit 31, a storage unit 32, a display unit 33, an operation unit 34, an input/output interface unit 35, and a system control unit 36. Further, the system control unit 36 and the input/output interface unit 35 are connected via a system bus 37.

The communication unit 31 controls communication with the tool bar providing server 10 and the like via the network 3. In addition, when the terminal 30 is a portable radio phone, the communication unit 31 has a wireless communication function so that the communication unit 31 is connected to a mobile communication network of the network 3.

The storage unit 32 includes, for example, a hard disk drive, and stores an operating system, a program of a web browser, and a program of a tool bar for the web browser. In the storage unit 32, for example, a log database (hereinafter referred to as "log DB") 32a which stores access history and the like of access with the web browser, and a character string database (hereinafter referred to as "character string DB") 32b which stores a character string set on the basis of the access history and the like are structured.

The display unit 33 is constituted by, for example, a liquid crystal display device or an EL (Electro Luminescence) device. On the display unit 33, a web page obtained from the network is displayed with the web browser.

The operation unit 34 is constituted by, for example, a keyboard and a mouse. The user inputs a response using the operation unit 34. In addition, when the display unit 33 is a display panel of a touch-switch method such as a touch panel, the operation unit 34 obtains position information about a location where the screen of the display unit 33 is pressed.

The input/output interface unit 35 is an interface between the communication unit 31 and the storage unit 32 and the system control unit 36.

The system control unit 36 includes, for example, a CPU 36a, a ROM 36b, and a RAM 36c. In the system control unit 36, the CPU 36a reads and executes various kinds of program stored in the ROM 36b, the RAM 36c, and the storage unit 32. For example, the system control unit 36 executes the program of the web browser to function as the web browser, or executes the program of the tool bar to function as the tool bar. Further, as the tool bar, the system control unit 36 determines whether the link information included in the web page is link information similar to a set character string or not, and specifies a display position where the similar link information is displayed in the web page.

(2.4 Screen Configuration and Function of Web Browser and a Tool Bar)

Next, the screen configuration and function of the web browser and the tool bar will be explained FIG. 5.

Figure 5:
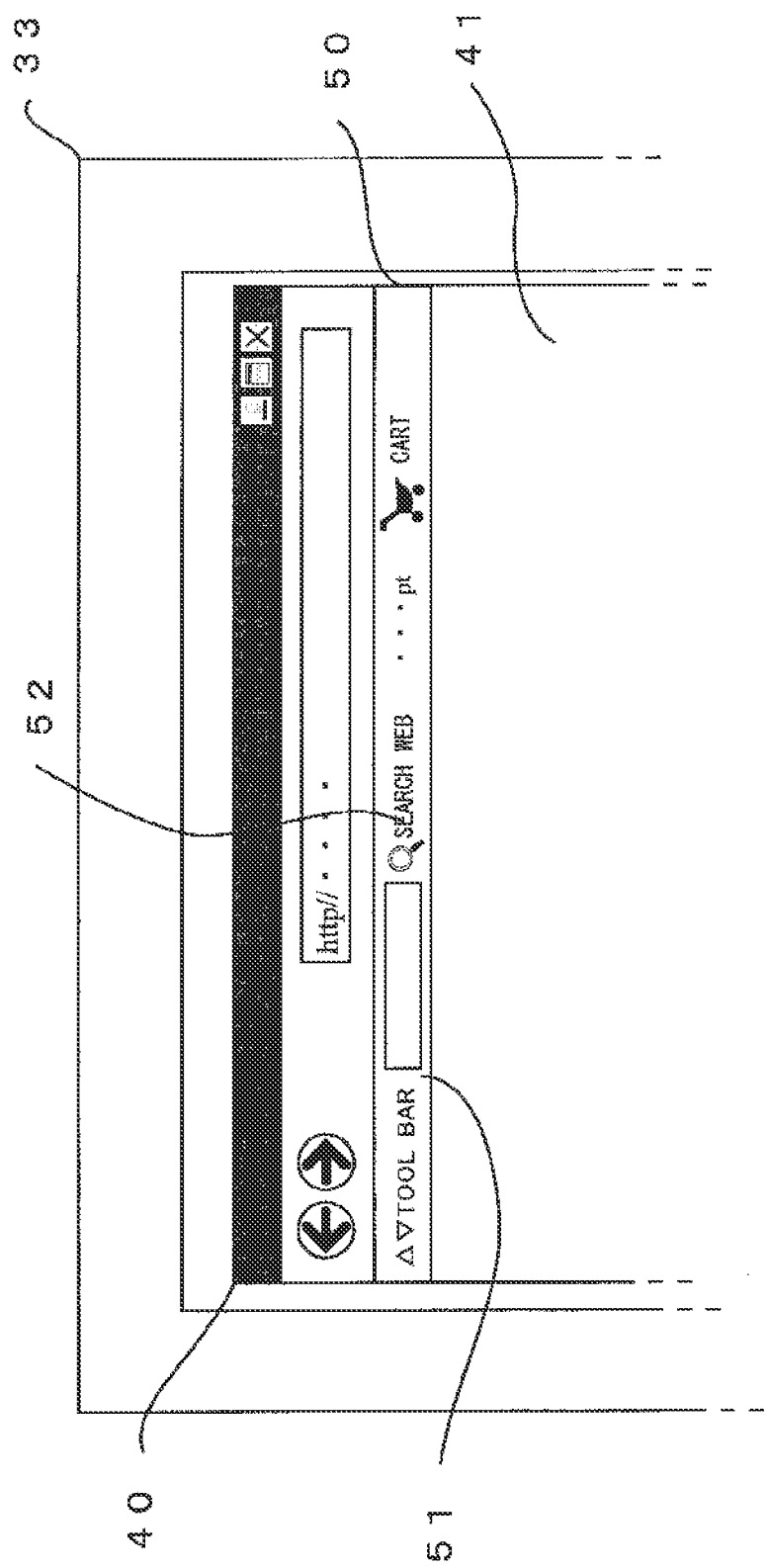
FIG. 5 is a schematic view illustrating an example of configuration of overview of a web browser and a tool bar displayed on the terminal of FIG. 1.

FIG. 5 is a schematic view illustrating an example of configuration of overview of the web browser and the tool bar displayed on the terminal 30.

As illustrated in FIG. 5, a web browser 40 displayed on the display unit 33 of the terminal 30 includes a web page display area 41 where a web page is displayed. A tool bar 50 provided by the tool bar providing server 10 and incorporated into the web browser 40 includes a search keyword input field 51 into which a search keyword is input, and includes a search button 52 for requesting search. Here, for example, the tool bar is some kind of menu in which buttons, boxes, and the like having functions are arranged in order to simplify the functions used by the user, and the tool bar is used while it is plugged into the web browser and the like.

The tool bar 50 has unique tool bar recognition information for recognizing the tool bar 50, and when the search is performed, the tool bar 50 transmits the tool bar recognition information to the tool bar providing server 10 and the like.

The tool bar 50 sets character strings required to obtain similar links, extracts link information from an HTML file by analyzing the HTML file, selects a similar link, and displays existence information about the similar link.

In the web page display area 41, a web page is displayed. The search keyword input field 51 is a search box, and becomes ready to receive a search keyword which is input with the keyboard of the operation unit 34, in response to pointing operation with the operation unit 34 (for example, the user uses the mouse to move the pointer displayed on the display unit 33 to the search box and clicks the search box).

In response to pointing operation with the operation unit 34, the search button 52 functions as a search start button for performing operation to transmit the search keyword and the like, which is input into the search keyword input field 51, to the search server 7.

The tool bar 50 provided by the tool bar providing server 10 performs the search so that a found search result is displayed in the web page display area 41. The tool bar 50 displays the existence information indicating the existence of the similar link information in a portion where the web page display area is displayed on the display unit 33, where the link information is the similar link.

The existence information is indication for notifying the user that there is a similar link, and is, for example, a mark which is conspicuous to the eyes of the user, a figure written with a warning message, and the like. Figures and marks of the existence information may include a display basic size, a basic shape, a basic color arrangement, and the like. The tool bar 50 may store the existence information in advance, and after the similarity is determined, it may be provided from the tool bar providing server 10.

[3. Operation of Display Apparatus]

Next, operation of a display apparatus according to an embodiment of the present invention will be explained FIGS. 6 to 10.

Figure 6:
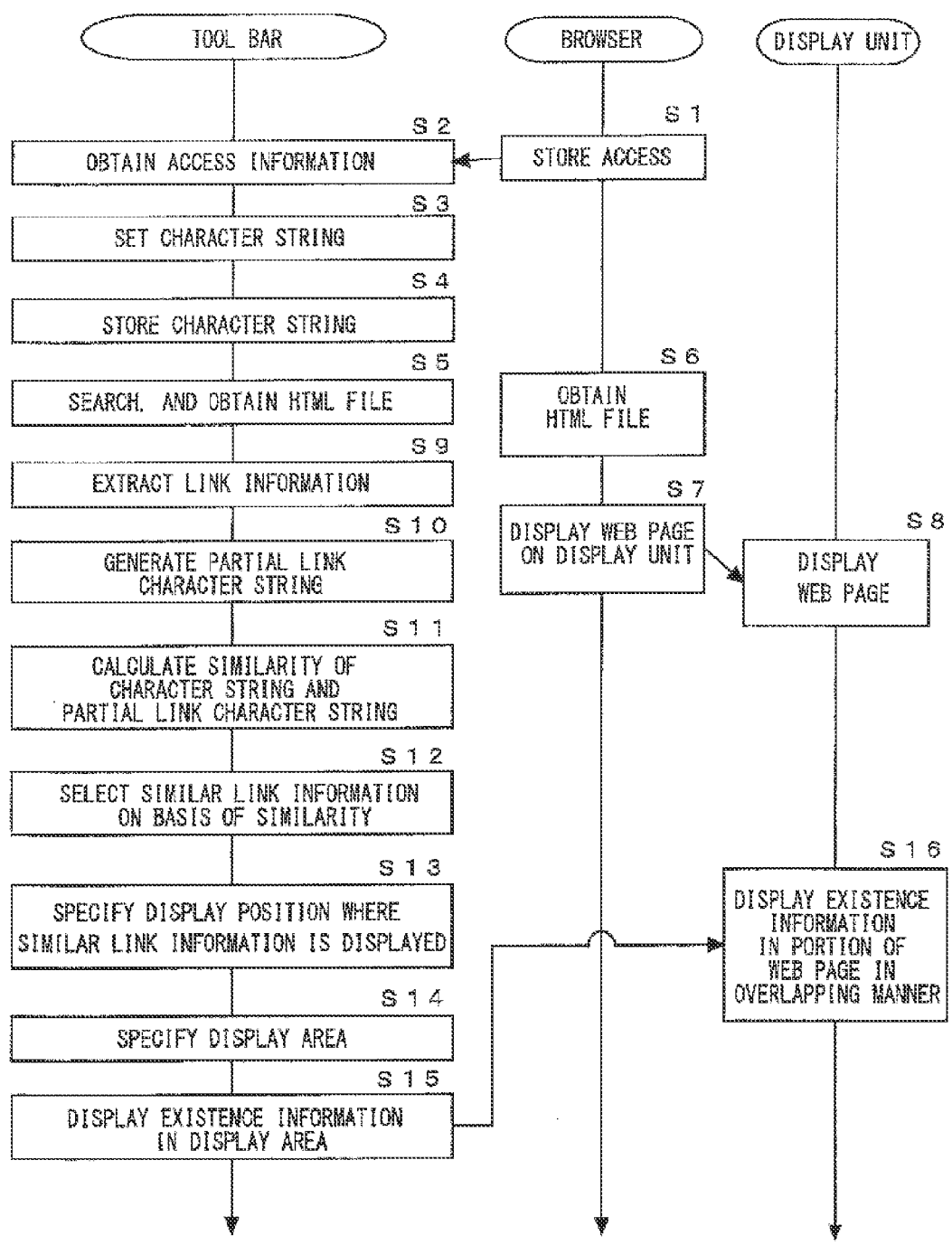
FIG. 6 is a sequence diagram illustrating an example of operation of the terminal of FIG. 1.
Figure 7:
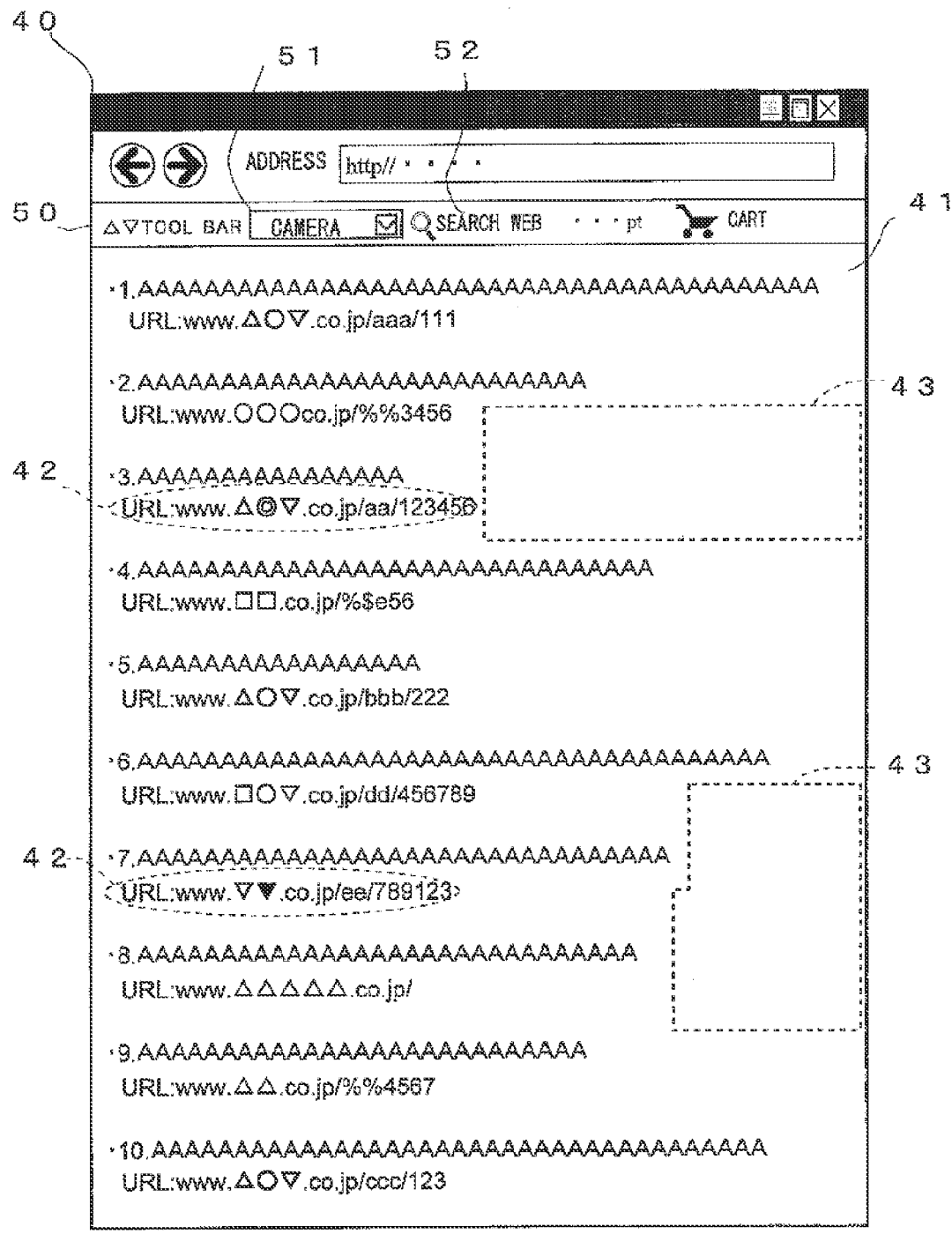
FIG. 7 is a schematic view illustrating an example of a web page displayed on the terminal of FIG. 1.
Figure 8:
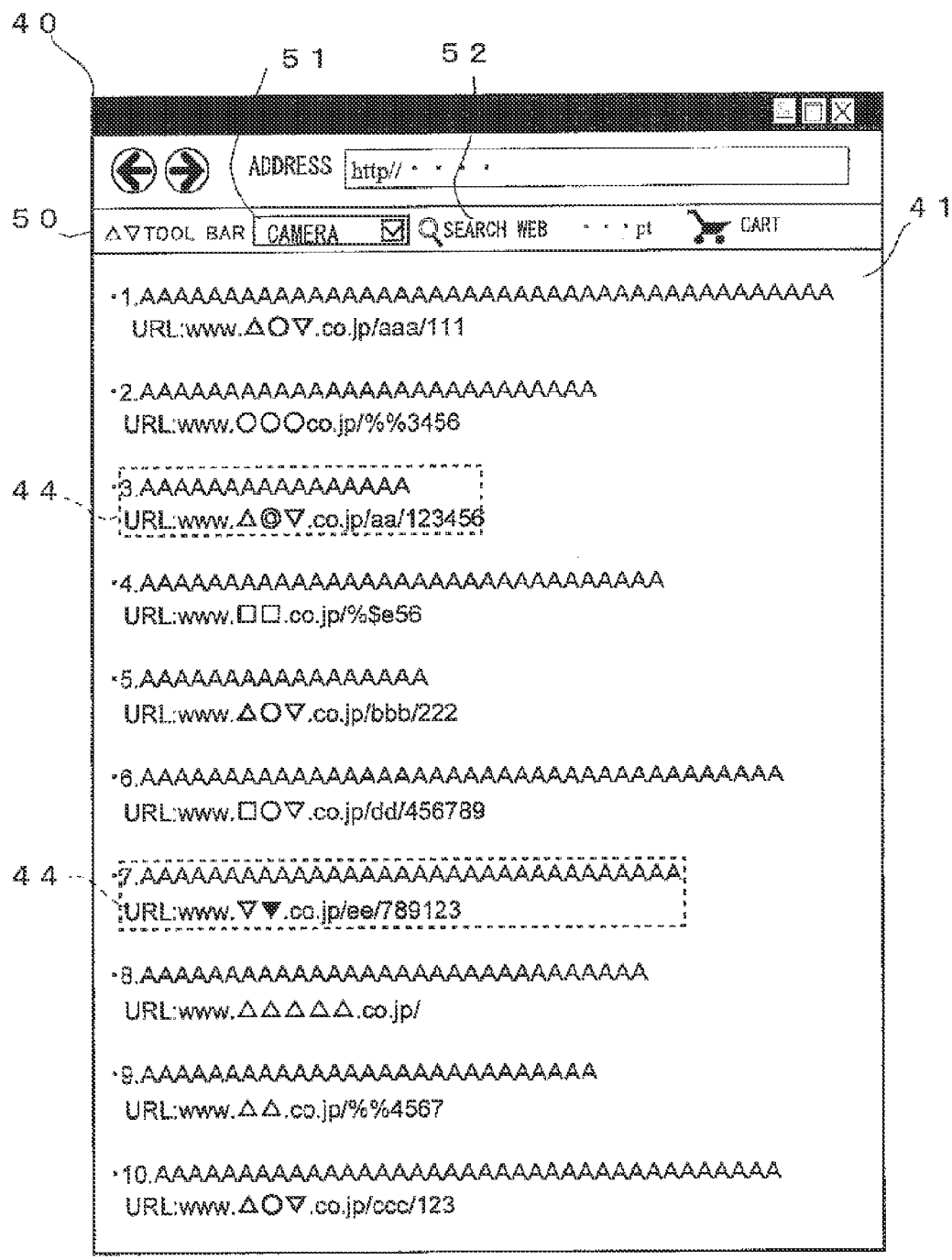
FIG. 8 is a schematic view illustrating an example of a web page displayed on the terminal of FIG. 1.
Figure 9:
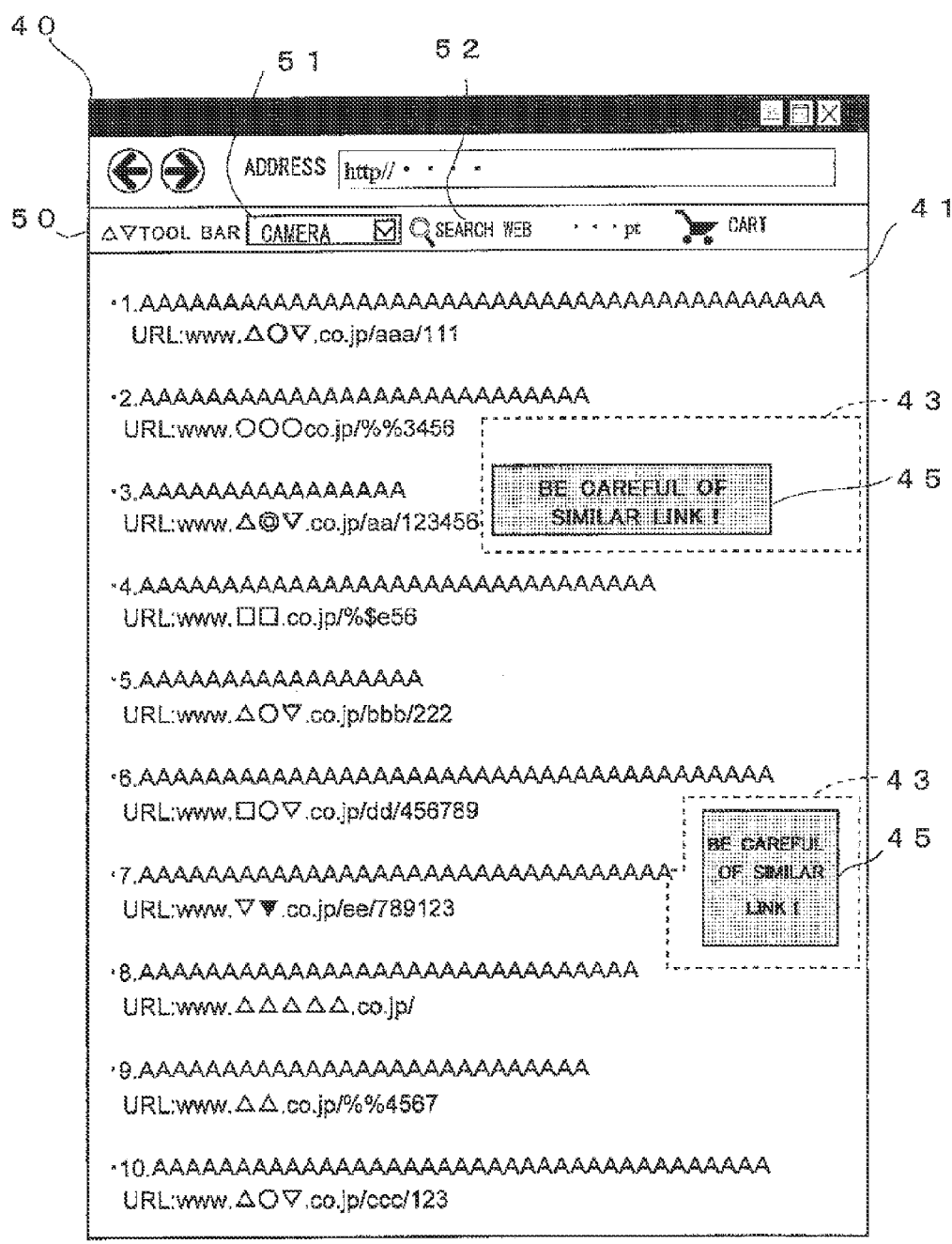
FIG. 9 is a schematic view illustrating an example showing existence information about similar link information displayed on a web page.
Figure 10:
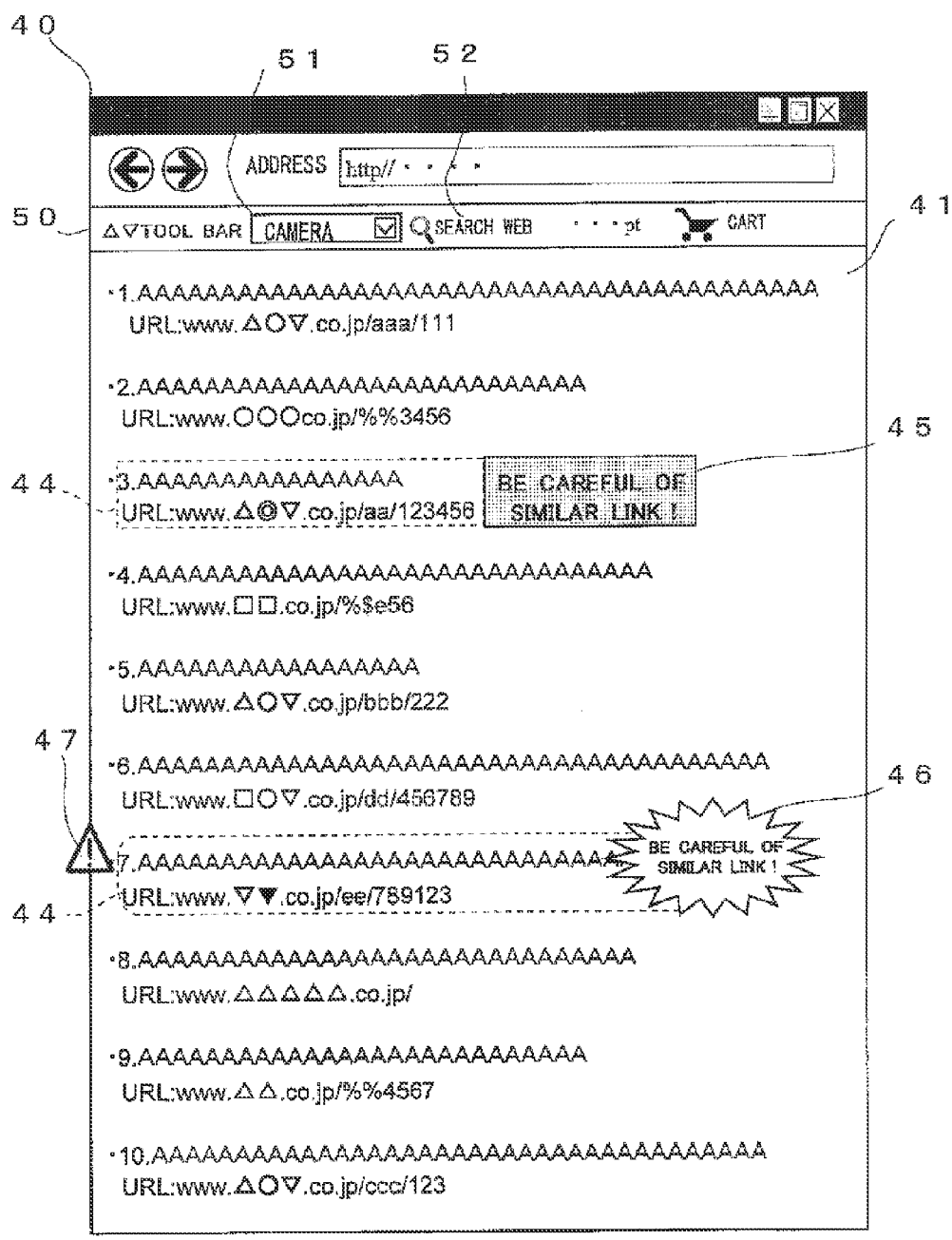
FIG. 10 is a schematic view illustrating an example showing existence information about similar link information displayed on a web page.

FIG. 6 is a sequence diagram illustrating an example of operation of the display apparatus. FIGS. 7 and 8 are schematic views illustrating examples of web pages displayed on the terminal 30. FIGS. 9 and 10 are schematic views illustrating examples showing existence information about similar link information displayed on web pages.

(3.1 Setting of Character String)

First, the web browser 40 stores access information about accessed web page (step S1). Specifically, as the web browser 40, the system control unit 36 of the terminal 30 records, to the log DB 32*a* of the storage unit 32, time information as well as access history such as a URL of accessed web page. In addition, it may be possible to configure such that the stored access history is erased after a predetermined period of time passes. Further, as the web browser 40, the system control unit 36 of the terminal 30 stores the number of times of accesses to the log DB 32*a* of the storage unit 32 for each URL of web page. As described above, the system control unit 36 of the terminal 30 functions as an example of access number storage means that stores the number of times of accesses for each web page. In addition, the number of times of accesses may be a total number of times of accesses for which no period of time is determined, or may be a number of times of accesses within a predetermined period of time which is re-calculated for each of predetermined periods of times.

Next, the tool bar 50 plugged into the web browser 40 of the terminal 30 obtains access information stored by the web browser 40 (step S2). Specifically, as the tool bar 50, the system control unit 36 of the terminal 30 obtains history information of access of web page from the log DB 32*a* of the storage unit 32 as access information.

Next, tool bar 50 sets a character string (step S3). Specifically, as the tool bar 50, the system control unit 36 of the terminal 30 looks up the log DB 32*a*, extracts a character string from a URL of a web page which is accessed for a number of times equal to or more than a predetermined threshold value (an example of web page specifying information), and sets the character string. In particular, in "http: //www.△○▽.co.jp/ . . . / . . . / . . . ", "http: //www.△○▽.com/ . . . / . . . ", and the like, a character string, i.e., "△○▽" and the like, is extracted from a portion prior to a generic top level domain or a country code top level domain such as ".co.jp/" and ".com/" in the domain names of the URLs. The system control unit 36 of the terminal 30 extracts a character string from a URL of web page which is often accessed by a user.

As described above, the system control unit 36 of the terminal 30 functions as an example of character string setting means that sets, as a character string, a character string included in the web page specifying information for specifying a location where a web page exists which is accessed with the web browser. The system control unit 36 of the terminal 30 also functions as an example of character string setting means that sets a character string from the web page specifying information for specifying a location where the web page exists, on the basis of the number of times the web page is accessed with the web browser.

Next, the tool bar 50 stores the set character string (step S4). Specifically, as the tool bar 50, the system control unit 36 of the terminal 30 stores character strings "△○▽", "▽▽", and the like extracted from the web page specifying information to the character string DB 32*b* of the storage unit 32.

(3.2 Display of Existence Information about Similar Link)

Next, display of existence information about similar link will be explained.

The tool bar 50 performs searches, and obtains an HTML file (step S5). As illustrated in FIG. 7, when the user of the terminal 30 inputs a search keyword to the search keyword input field 51 and presses the search button 52, the system control unit 36 of the terminal 30 transmits a search query to the search server 7 as the tool bar 50. At this occasion, the system control unit 36 of the terminal 30 transmits tool bar recognition information for specifying the tool bar 50 to the tool bar providing server 10. Then, as the tool bar 50, the system control unit 36 of the terminal 30 receives an HTML file of the search result in response to the search keyword (an example of display data displayed on the web page) from the search server 7, and stores it to the storage unit 32 or the RAM 36*c*. As described above, the system control unit 36 of the terminal 30 functions as an example of display data obtaining means that obtains display data.

Here, the system control unit 14 of the tool bar providing server 10 calculates the number of times of searches of the tool bar 50 in accordance with the received tool bar recognition information. Then, the system control unit 14 of the tool bar providing server 10 transmits the number of times of searches, point information corresponding to the number of times of searches, and the like to the terminal 30.

Next, the web browser 40 obtains an HTML file from the storage unit 32 and the like (step S6). Specifically, as the web browser 40, the system control unit 36 of the terminal 30 obtains the HTML file of the search result stored in the storage unit 32 or RAM 36c (an example of display data displayed in the web page display area 41). In addition, the web browser 40 may obtain the HTML file from the search server 7 in advance and store it to the storage unit 32 or the RAM 36c, and the tool bar 50 may obtain the HTML file stored by the web browser 40.

Next, the web browser 40 displays the web page on the display unit (step S7). Specifically, as the web browser 40, the system control unit 36 of the terminal 30 displays the web page on the display unit 33 on the basis of the obtained HTML file. More specifically, the system control unit 36 of the terminal 30 transmits a video signal, which is to be displayed on the display unit 33, to the display unit 33.

Next, the web page is displayed on the display unit 33 (step S8). As illustrated in FIG. 7, the web page of the search result is displayed in the web page display area 41 of the display unit 33. As described above, the system control unit 36 of the terminal 30 functions as an example of search means that receives input of a search keyword, obtains a search result in response to the search keyword, and displays the search result in the web page display area 41.

Next, the toolbar 50 extracts link information (step S9). Specifically, as the tool bar 50, the system control unit 36 of the terminal 30 extracts link information such as "http: //www.Δ⊙∇.co.jp/ . . . / . . . / . . . " in a portion of a tag where a link to a web page is provided (for example, <a href="http: //www.Δ⊙∇.co.jp/ . . . / . . . / . . . "> . . . </a>) from the data of the HTML file obtained in step S5. As described above, the system control unit 36 of the terminal 30 functions as an example of link information extracting means that extracts link information from the obtained display data.

Next, the toolbar 50 generates a partial link character string from the link information (step S10). For example, as the tool bar 50, the system control unit 36 reads a character string, which is set in advance, from the character string DB 32b, and generates a partial character string by moving the link information, character by character, by the number of characters of the character string which is set in advance. When the character string which has been set is three characters "Δ⊙∇", the system control unit 36 successively generates three-character link character string such as "www", "ww.", and "w.∇", from "www.Δ⊙∇.co. jp/ . . . / . . . / . . . " which is subsequent to a scheme name "http: //". In addition, as the tool bar 50, the system control unit 36 may be configured to generate a partial link character string such as "Δ⊙∇" and "abcd" by dividing the link information such as extracted "http: //www.Δ⊙∇.co. jp/ . . . /abcd/ . . . " with delimiters such as "/" and ".". Further, as the tool bar 50, the system control unit 36 of the terminal 30 may be configured to generate a partial link character string by dividing the character string, which is set in advance, with a predetermined number of characters (for example, six characters if it is a camera). As described above, the system control unit 36 of the terminal 30 functions as an example of partial link character string generating means that generates the partial link character string from the extracted link information. The system control unit 36 of the terminal 30 also functions as an example of partial link character string generating means that generates the partial link character string by dividing the link information with a predetermined character set in advance. The system control unit 36 of the terminal 30 also functions as an example of partial link character string generating means that generates the partial link character string by dividing the link information with a predetermined number of characters.

Next, the tool bar 50 calculates the similarity between the generated partial link character string and the character string set in advance (step S11). Specifically, the system control unit 36 calculates each similarity on the basis of the distance between character strings of the character string which is set in advance and the generated partial link character string. In addition, examples of similarities include character string distances such as Jaro-Winkler distance, Levenshtein distance, and the like. As described above, the system control unit 36 of the terminal 30 functions as an example of similarity calculating means that calculates the similarity of the character string and the partial link character string.

Next, the tool bar 50 selects similar link information from link information (step S12). Specifically, as the tool bar 50, the system control unit 36 of the terminal 30 selects link information determined to be similar link information. Specifically, when there is a partial link character string of which similarity is beyond a predetermined threshold value, the system control unit 36 selects the link information including the partial link character string as the similar link information. As described above, the system control unit 36 of the terminal 30 functions as an example of similarity determining means that determines whether the link information is similar link information or not on the basis of the calculated similarity. It also functions as an example of similarity determining means that determines whether the link information is similar or not on the basis of similarity between the set character string and the partial link character string included in the link information. In addition, when Jaro-Winkler distance is employed as the similarity, determination may be made as follows: in a case of a partial link character string of which similarity is "1" which is among partial link character strings of which similarity is more than a threshold value (specifically, the character string and the partial link character string are the same), the link information may be determined not to be similar link information.

Next, the tool bar 50 specifies the display position where the link information determined to be the similar link information is displayed (step S13). Specifically, as the tool bar 50, the system control unit 36 of the terminal 30 analyzes the data of the obtained HTML file on the basis of the size of the web page display area 41, and as illustrated in FIG. 7, specifies the display position 42 where the similar link information is displayed in the web page display area 41. As described above, when the link information is determined to be the similar link information, the system control unit 36 of the terminal 30 functions as an example of display position specifying means that specifies the display position where the extracted link information is displayed.

Next, the tool bar 50 specifies the display area where the existence information indicating existence of the similar link information is displayed on the basis of the display position (step S14). Specifically, as the tool bar 50, the system control unit 36 of the terminal 30 analyzes the data of the obtained HTML file on the basis of the size of the web page display area 41, and as illustrated in FIG. 7, specifies, in proximity to the display position 42, a display area 43 of a blank area where image data, text data, and the like are not displayed (an example of position related to the display position 42). Alternatively, as illustrated in FIG. 8, the system control unit 36 of the terminal 30 specifies a rectangular advertisement display area 44 including a portion where the similar link information and information related to the similar link information (for example, snippet and the like) are displayed (an example of position related to the display position 42). The system control unit 36 of the terminal 30 determines, as the display area 44, the inside of the rectangular shape or a area adjacent to any one of the frames of the rectangular shape. As described above, the system control unit 36 of the terminal 30 functions as an example of display area specifying means that specifies the display area for displaying the existence information indicating existence of the similar link information on the basis of the specified display position.

Next, the tool bar 50 displays the existence information in the display area (step S15). Specifically, first, as the tool bar 50, the system control unit 36 of the terminal 30 changes the display size from the display basic size of the figure and the mark of the existence information so that it fits within each display area 43 in accordance with the shape of each display area 43. As described above, the system control unit 36 of the terminal 30 changes the display size of the specified existence information at the position related to the specified display position. Next, as illustrated in FIG. 9, as the tool bar 50, the system control unit 36 of the terminal 30 displays the existence information 45 within each display area 43. As described above, the system control unit 36 of the terminal 30 functions as an example of existence information display means that displays the existence information indicating the existence of the similar link information in the specified display area.

In addition, as illustrated in FIG. 10, the system control unit 36 of the terminal 30 may display an attention mark 47 and existence information 45, 46 around the display area 44.

Next, the tool bar 50 displays the existence information in the portion of the web page in an overlapping manner (step S16). Specifically, as illustrated in FIGS. 9 and 10, as the tool bar 50, the system control unit 36 of the terminal 30 displays the existence information 45, 46 and the attention mark 47 as an example of existence information in the web page display area 41 of the display unit 33. As described above, the system control unit 36 of the terminal 30 functions as an example of existence information display means that displays existence information indicating existence of similar link information at the position related to the specified display position.

Hereinabove, according to the present embodiment, the character string which is set in advance are stored, and the display data are obtained, and from among the obtained display data, the link information is extracted, and the partial link character string is generated from the extracted link information, and the similarity of the character string and the partial link character string is calculated, and a determination is made as to whether the link information is the similar link information or not on the basis of the calculated similarity, and when the link information is determined to be the similar link information, the display position 42 where the extracted link information is displayed is specified, and the display area 43 or display area 44 where the existence information indicating existence of the similar link information is displayed is specified on the basis of the specified display position, and the existence information indicating existence of the similar link information is displayed in the specified display area 43 or display area 44, so that the user is notified of the existence information, and the user is prevented from accessing or viewing, by mistake, a confusing web site including a similar character string in a site name, a URL, and the like.

According to the present embodiment, link information that fully matches one of a few character strings set as the white list is determined to be white, and in addition, link information that is not similar to the character strings which have been set can also be determined to be white. That is, determination can be made while the range of the white list is expanded into even non-similar range, and therefore, the number of character strings which are set may be less, and the amount of data stored in the character string DB 32b can be reduced. Further, it is not necessary to update the character strings frequently and add character strings to the white list. Here, in response to the determination as white, the link information may be allowed to be displayed, or the existence information 45 for drawing attention that it is a similar link may not be displayed, or information indicating that it is safe may be displayed.

In addition, in the conventional white list method, those that do not fully match a character string in the white list are determined to be black, and therefore, unless the white list is updated and maintained constantly, even an authentic link is always determined to black if it is unknown. In the conventional black list method, those that fully match a character string in the black list are determined to be black. Both of the white list method and the black list method have the above problems, but according to the present embodiment, the number of character strings that are set is less, and the number of times the character strings are updated is also less.

When a partial link character string obtained by dividing link information with a character set in advance is generated, or when a partial link character string obtained by dividing link information with a predetermined number of characters is generated, the partial link character string is automatically generated, so that this makes it easy to specify the target of calculation of the similarity, and therefore, the similar link information can be easily found automatically.

When a determination as to similarity is determined on the basis of similarity of a character string which have been set and a link character string included in link information, whether it is a confusing web site or not can be determined in a more stable manner.

When character strings are set, it is not necessary to download a black list, a white list, and the like in advance. Moreover, in accordance with the state of usage by the user, the character strings can be changed dynamically, or customization can be made for each user.

When a character string included in web page specifying information for specifying a location where a web page accessed with a web browser exists is set as the character string, the character strings can be changed dynamically, or customization can be made for each user, in accordance with the state of usage by the user. In particular, when the number of times of accesses is stored for each web page, and the number of times of accesses to the web page accessed with the web browser 40 is obtained, and a character string included in web page specifying information for specifying a location where the web page exists is set as a character string on the basis of comparison between the number of times of accesses and a threshold value set in advance, then in such case, the character strings can be changed dynamically, or customization can be made for each user, in accordance with the state of usage by the user.

In particular, when the number of times of accesses is reset and counting is resumed again when a predetermined period of time elapses in order to obtain the number of times of accesses, a character string that reflects the latest access state can be set. When the number of times of accesses is added up without providing a predetermined period of time for obtaining the number of times of accesses, a character string can be set in the accumulated data in association with a web page and the like that the user frequently accesses.

When input of a search keyword is received, and a search result is obtained in response to the search keyword, and a search result is displayed on a web page, then it is possible to effectively draw attention to the search result, which can prevent access to a confusing web site.

Next, a modification of existence information of similar link information displayed on a web page will be explained FIG. 11.

Figure 11:
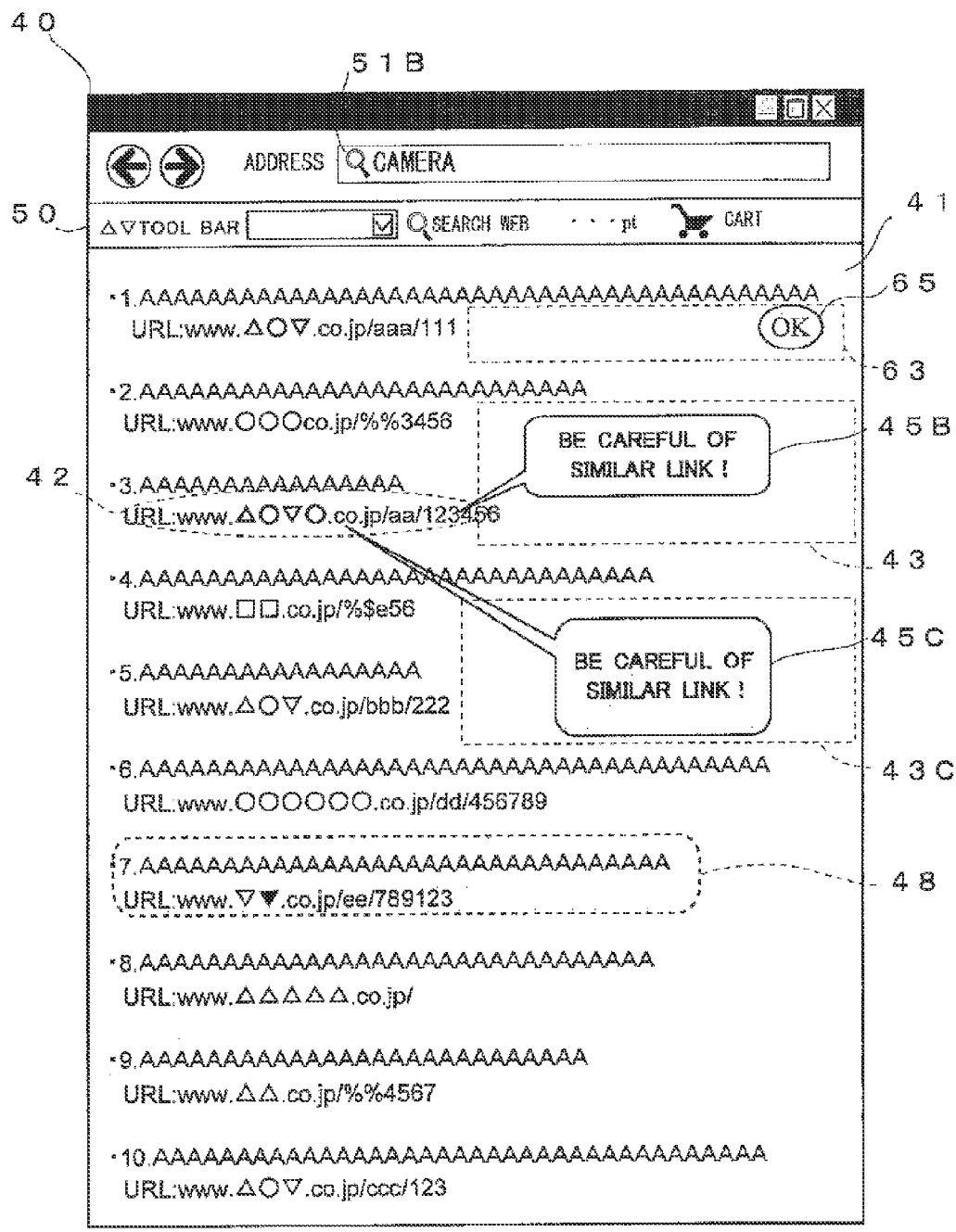
FIG. 11 is a schematic view illustrating an example showing existence information about similar link information displayed on a web page.

FIG. 11, is a schematic view illustrating an example showing existence information about similar link information displayed on a web page.

As illustrated in FIG. 11, as the tool bar 50, the system control unit 36 of the terminal 30 may display balloon form a existence information 45B on the display area 43. As the tool bar 50, the system control unit 36 of the terminal 30 may display balloon format existence information 45C in a display area 43C subsequently close to the display position 42 in the display area 43. The existence information 45B, 45C clarifies the locations of the similar link information. Like the display area 43C, the portion of the similar link information is clarified by the existence information 45C even at a location away from the display position 42.

As the tool bar 50, the system control unit 36 of the terminal 30 may be configured to emphasize, blink, or change the color using the existence information 48 displayed to be in consistent with a rectangular shape including the portion where similar link information and information related to the similar link information (for example, snippet) is displayed. Even in such case, the location of the similar link information is clarified.

As illustrated in FIG. 11, as the tool bar 50, the system control unit 36 of the terminal 30 may display existence information 65 in a display area 63 for link information including a character string which has been set. As the tool bar 50, the system control unit 36 of the terminal 30 specifies link information including a character string that has been set from among link information included in the obtained display data, and in step S12, on the screen of the web page, the system control unit 36 of the terminal 30 also specifies the display position where the specified link information is displayed. Then, in step S14, the system control unit 36 of the terminal 30 displays existence information indicating existence of link information (for example, existence information 65) at a position where link information is specified (for example, a display area 63). In this case, the user can safely access a web page indicated by the link information. In addition, the shape and the like of the existence information 65 may be those of the existence information 45, 45B, 45C, 46, 47, 48 and the like indicating existence of the similar link information as shown above. Existence information 65 may be displayed, as a mark indicating that it is determined to be white, for authentic link information and link information determined to be not similar.

In addition, as illustrated in FIG. 11, the search result displayed on the web page 41 is a result obtained by inputting a keyword into the search keyword input field 51B and searching with the search function of the web browser 40. As described above, search may be done without using the tool bar 50, and the present embodiment may also be applied to the search result given in response thereto.

Next, existence information for a web page different from a search result will be explained FIGS. 12 and 13.

Figure 12:
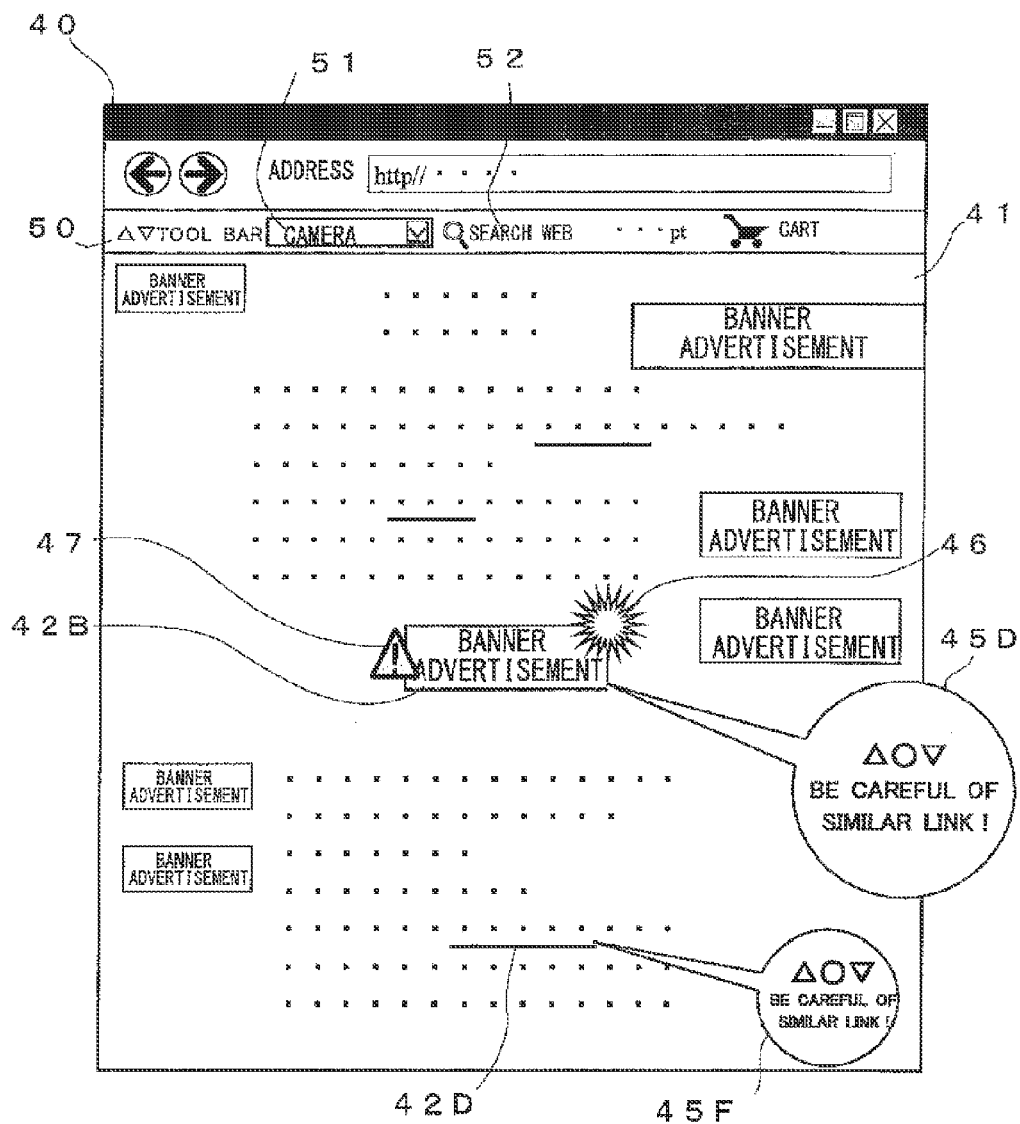
FIG. 12 is a schematic view illustrating an example showing existence information about similar link information displayed on a web page.
Figure 13:
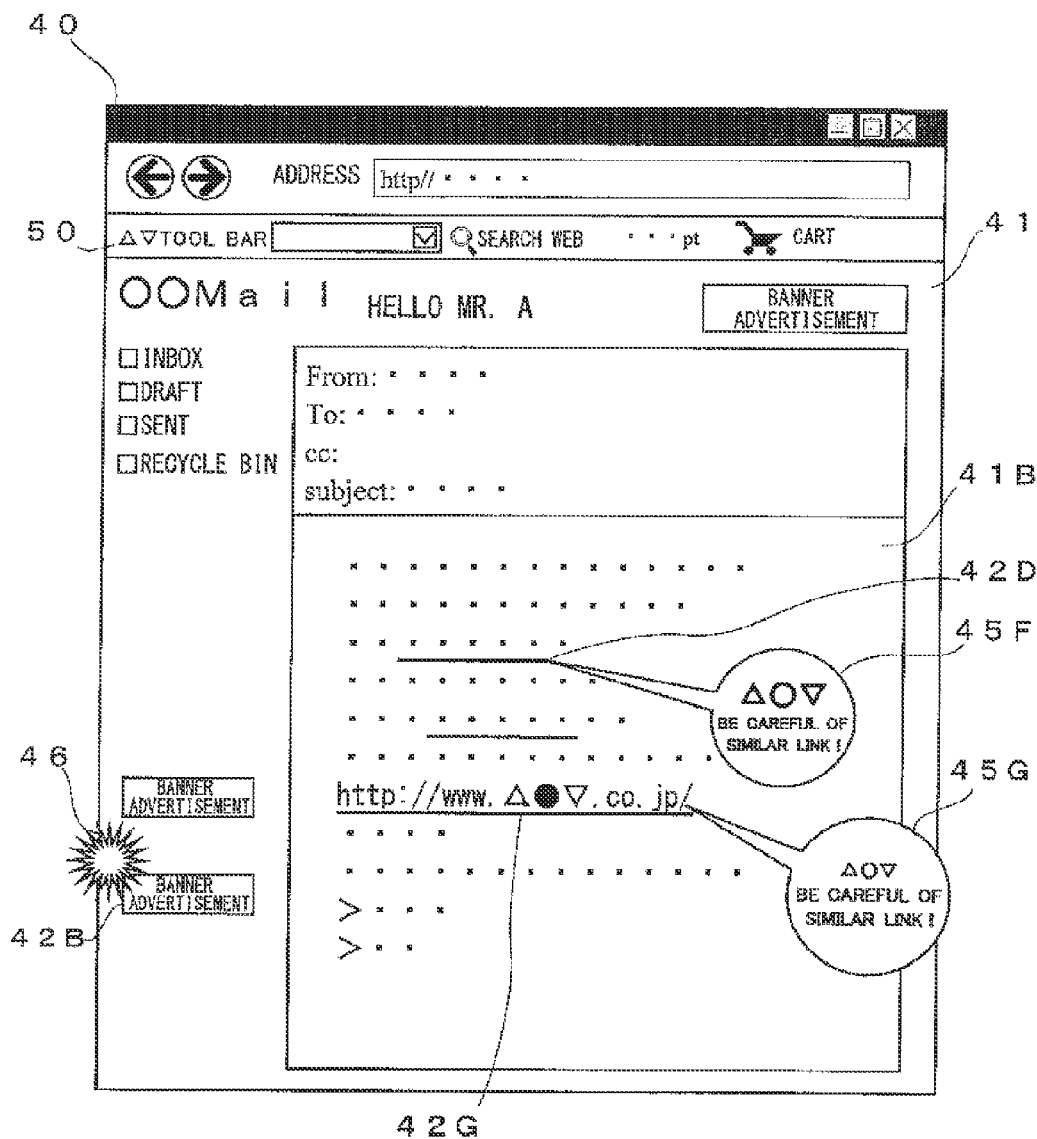
FIG. 13 is a schematic view illustrating an example showing existence information about similar link information displayed on a web page.

FIGS. 12 and 13 are schematic views illustrating examples showing existence information about similar link information displayed on web pages.

As illustrated in FIG. 12, as the tool bar 50, the system control unit 36 of the terminal 30 may display balloon format existence information 45D, 45F and attention marks 46, 47 as existence information, for a link portion 42D and a banner advertisement 42B having similar link information in portions where banner advertisements and links are provided. In addition, like the existence information 45D, the existence information may be displayed to be off from the web page display area 41.

As illustrated in FIG. 13, on a screen of a web mail, the system control unit 36 of the terminal 30 may display existence information 46, 45F for link portions 42D, 42G and a banner advertisement 42B having similar link information in portions where banner advertisements and links are provided. In this case, the system control unit 36 of the terminal 30 may also analyze the area 41B indicating the contents of mails of existing web mails, and may display existence information 45F, 45G for portions where there is similar link information (link portions 42D, 42G).

In addition, as the tool bar 50, the system control unit 36 of the terminal 30 may change the existence information, which is to be displayed, on the basis of the similarity of partial link character string and the character string calculated in step S10. For example, in accordance with the similarity, the system control unit 36 of the terminal 30 may set an attention level, may display the attention level for the existence information 45 and the like, may change the shape of the existence information 45 and the like, and may change the color arrangement of the existence information 45 and the like. In this case, it is possible to effectively attract user's attention in accordance with the level of the similarity.

For example, the system control unit 36 of the terminal 30 may store a specifying character string which is always determined to be similar in the similarity determination, like the black list, to the character string DB 32*b* in advance. This specifying character string may be possessed by the tool bar 50 in advance, or the tool bar providing server 10 may provide an updated specifying character string. As described above, the specifying character string which is determined to be similar in the similarity determination is stored, and when the link information is determined to include the specifying character string, the link information is determined to be similar link information, and existence information can always be displayed in advance for a link to a confusing web page, which the user is preferably prevented from accessing.

For example, the system control unit 36 of the terminal 30 may store a non-similar character string which is determined not to be similar in the similarity determination, like a white list, to the character string DB 32*b* in advance. This non-similar character string may be possessed by the tool bar 50 in advance, or the tool bar providing server 10 may provide an updated non-similar character string. As described above, the non-similar character string which is determined not to be similar in the similarity determination is stored, and when the link information is determined to include the non-similar character string, the link information is determined not to be similar link information, and this can prevent the existence information from being attached to a group company related to the character string which has been set. In addition, without storing the non-similar character string to the character string DB 32*b*, and only the character string which has been set is stored to the character string DB 32*b* in advance, and existence information is not attached when similarity is determined in the similarity determination. In such case, the existence information is prevented from being attached to the group company related to the character string which has been set.

With regard to setting of a character string, when an accessed web page is a web page that supports encryption such as HTTPS (Hyper Text Transfer Protocol over Secure Socket Layer), the system control unit 36 of the terminal 30 may set the character string from a web page specifying information such as a URL of this web page, as the tool bar 50. For example, the system control unit 36 of the terminal 30 extracts a character string, except a generic symbol such as "https" and "www", from a URL of an accessed web page, or extracts a character string before a generic top level domain and a country code top level domain such as ".com" and ".co.jp" from a portion of a domain name of a URL. The system control unit 36 of the terminal 30 may obtain multiple URLS from access history and the like in the log DB 32a, generate partial character strings from the obtained URLs, and extract a character string uniquely used for setting of a character string, except the partial character strings such as "http", "https", and "www" which are the same in multiple URLs by comparing the partial character strings.

Regarding the setting of the character string, when the user accesses not only a web page supporting encryption but also a web page having an input unit for a user identification number such as an ID and a member number or an authentication code such as a password, the system control unit 36 of the terminal 30 may extract a character string from the URL of the web page.

As described above, when, on the basis of a web page accessed with the web browser 40, a character string is set from web page specifying information for specifying a location where a web page exists (for example, URL), this can prevent users from accessing and viewing a confusing web site with regard to an important web page like the web page supporting encryption.

In accordance with a predetermined level, the determination criteria as to the similarity and the predetermined threshold value of the similarity may be changed. For example, when the character string which has been set is "Δ○∇ten", determination is made as follows. In level 1, "Δ○∇tenA" (character addition type) and "Δ○∇ton" (partial character replacement type) are determined to be similar. In level 2, "Δ○∇tenA" is determined not to be similar, but "Δ○∇ton" is determined to be similar. In level 3, "Δ○∇tenA" is determined not to be similar, and "Δ○∇ton" is also determined not to be similar. As described above, by changing the determination criteria as to the similarity and the threshold value of the similarity, the determination criteria as to fishing can be controlled flexibly in accordance with the situation (access control).

The web browser 40 which is an agent may have the function of the tool bar 50 by itself. The terminal 30 may execute it in background as a resident program installed to the terminal 30 in advance so that the function of the tool bar can be achieved by the terminal 30.

The tool bar providing server 10 and the information providing server 20 may have the function of the tool bar 50. The storage unit 12 of the tool bar providing server 10 or the storage unit 22 of the information providing server 20 store access information stored by the web browser 40 and character strings which have been set. Then, the user of the terminal 30 inputs a search keyword to the search keyword input field 51, and when the search button 52 is pressed, the system control unit 36 of the terminal 30 transmits a search query to the tool bar providing server 10 or the information providing server 20, as the tool bar 50. Next, the tool bar providing server 10 or the information providing server 20 receiving the search query transmits the search query to the search server 7 and obtains an HTML file like step S5. Next, the tool bar providing server 10 or the information providing server 20 performs processing from step S9 to step S14. Next, as an example of display data generating means, the tool bar providing server 10 or the information providing server 20 changes the display size from the display basic size of the figure and the mark of the existence information so that it fits within each display area 43 in accordance with the shape of each display area 43, and generates display data of the web page 40 where the existence information 45, 46 and the attention mark 47 as an example of existence information are displayed in the web page display area 41 on the web page display area 41. Next, the tool bar providing server 10 or the information providing server 20 transmits the generated display data to the terminal 30. The terminal 30 receiving the generated display data displays the data on the display unit 33.

Further, the present invention is not limited to each of the above embodiments. Each of the above embodiments is an example, and configurations substantially the same as the technical concept described in the claims of the present invention and achieving similar actions and effects are included in the technical scope of the present invention no matter whatever the configurations are.

EXPLANATION OF REFERENCE NUMERALS

10: tool bar providing server
20: information providing server
30: terminal
42: display position
42B: banner advertisement (display position)
42D, 42G: link portion (display position)
43, 44: display area
45, 45B, 45C, 45D, 45F, 45G, 46, 48: existence information
47: attention mark (existence information)
50: tool bar

The invention claimed is:

1. A display apparatus comprising:
at least one memory operable to store program instructions; and
at least one processor operable to access said memory, read said program instructions, and operate according to said program instructions, said program instructions including:
character string storing instructions that cause at least one of said at least one processor to store a character string which is set in advance;
display data obtaining instructions that cause at least one of said at least one processor to obtain display data;
link information extracting instructions that cause at least one of said at least one processor to extract link information from the obtained display data;
partial link character string generating instructions that cause at least one of said at least one processor to generate a partial link character string from the extracted link information only when an accessed web page corresponding to the character string is determined to have importance, said determination of importance including a test of at least one of whether the website supports encryptions, supports Hyper Text Transfer Protocol over Secure Socket Layers (HTTPS), requires a password, requires authentication, and requires identification information;
similarity calculating instructions that cause at least one of said at least one processor to calculate similarity of the character string and the partial link character string;
similarity determining instructions that cause at least one of said at least one processor to determine whether the link information is similar link information or not on the basis of the calculated similarity;
display position specifying instructions that cause at least one of said at least one processor to specify a display position where the extracted link information is displayed, when the link information is determined to be the similar link information in the determining instructions;
display area specifying instructions that cause at least one of said at least one processor to specify a display area for displaying existence information indicating existence of the similar link information on the basis of the specified display position; and
existence information display instructions that cause at least one of said at least one processor to display the existence information indicating existence of the similar link information in the specified display area.

2. The display apparatus according to claim 1, wherein, the partial link character string generating instructions cause at least one of said at least one processor to generate the partial link character string by dividing the link information with a character set in advance.

3. The display apparatus according to claim 1, wherein, the partial link character string generating instructions cause at least one of said at least one processor to generate the partial link character string by dividing the link information with a predetermined number of characters.

4. The display apparatus according to claim 1 further comprising a character string setting instructions that cause at least one of said at least one processor to set the character string.

5. The display apparatus according to claim 4, wherein, the character string setting instructions cause at least one of said at least one processor to set a character string included in web page specifying information for specifying a location where a web page accessed with a web browser exists as the character string.

6. The display apparatus according to claim 5 further comprising access number storing instructions that cause at least one of said at least one processor to store a number of times of accesses for each web page,
wherein, the character string setting instructions obtain the number of times a web page is accessed with the web browser, and set on the basis of comparison between the number of times of accesses and a threshold value set in advance, the character string included in web page specifying information for specifying a location where the web page exists as the character string.

7. The display apparatus according to claim 1 further comprising a search instructions that input of a search keyword, obtaining a search result in response to the search keyword, and displaying the search result.

8. The display apparatus according to claim 1, wherein, the character string storing instructions cause at least one of said at least one processor to store a specifying character string determined to be similar in the similarity determining instructions, and
the similarity determining instructions cause at least one of said at least one processor to determine the link information to be similar link information, when the link information is determined to include the specifying character string.

9. The display apparatus according to claim 1, wherein, the character string storing instructions cause at least one of said at least one processor to store a non-similar character string determined not to be similar in the similarity determining step is stored, and
the similarity determining instructions cause at least one of said at least one processor to determine the link information not to be similar link information, when the link information is determined to include the non-similar character string.

10. The display apparatus according to claim 2, wherein, the character string storing instructions cause at least one of said at least one processor to store a specifying character string determined to be similar in the similarity determining instructions, and
the similarity determining instructions cause at least one of said at least one processor to determine the link information to be similar link information, when the link information is determined to include the specifying character string.

11. The display apparatus according to claim 2, wherein, the character string storing instructions cause at least one of said at least one processor to store a non-similar character string determined not to be similar in the similarity determining instructions, and
the similarity determining instructions cause at least one of said at least one processor to determine the link information not to be similar link information, when the link information is determined to include the non-similar character string.

12. The display apparatus according to claim 3, wherein, the character string storing instructions cause at least one of said at least one processor to store a specifying character string determined to be similar in the similarity determining instructions, and
the similarity determining instructions cause at least one of said at least one processor to determine the link information to be similar link information, when the link information is determined to include the specifying character string.

13. The display apparatus according to claim 3, wherein, the character string storing instructions cause at least one of said at least one processor to store a non-similar character string determined not to be similar in the similarity determining instructions, and
the similarity determining instructions cause at least one of said at least one processor to determine the link information not to be similar link information, when the link information is determined to include the non-similar character string.

14. An information processing method for an information processing apparatus for performing information processing for displaying information, the information processing method comprising:
storing a character string which is set in advance when said character string points to a website determined to have importance;
obtaining display data;
extracting link information from the obtained display data;
generating a partial link character string from the extracted link information only when an accessed web page corresponding to the character string is determined to have importance, said determination of importance including a test of at least one of whether the website supports encryption, supports Hyper Text Transfer Protocol over Secure Socket Layers (HTTPS), requires a password, requires authentication, and requires identification information;

calculating similarity of the character string and the partial link character string;

determining whether the link information is similar link information or not on the basis of the calculated similarity;

specifying a display position where the extracted link information is displayed, when the link information is determined to be the similar link information in the determining step;

specifying a display area for displaying existence information indicating existence of the similar link information on the basis of the specified display position; and generating display data in which the existence information indicating existence of the similar link information is displayed in the specified display area.

15. An information processing apparatus comprising:

at least one memory operable to store program instructions; and at least one processor operable to access said memory, read said program instructions, and operate according to said program instructions, said program instructions including:

character string storing instructions that cause at least one of said at least one processor to store a character string which is set in advance;

display data obtaining instructions that cause at least one of said at least one processor to obtain display data;

link information extracting instructions that cause at least one of said at least one processor to extract link information from the obtained display data;

partial link character string generating instructions that cause at least one of said at least one processor to generate a partial link character string from the extracted link information only when an accessed web page corresponding to the character string is determined to have importance, said determination of importance including a test of at least one of whether the website supports encryption, supports Hyper Text Transfer Protocol over Secure Socket Layers (HTTPS), requires a password, requires authentication, and requires identification information;

similarity calculating instructions that cause at least one of said at least one processor to calculate similarity of the character string and the partial link character string;

similarity determining instructions that cause at least one of said at least one processor to determine whether the link information is similar link information or not on the basis of the calculated similarity;

display position specifying instructions that cause at least one of said at least one processor to specify a display position where the extracted link information is displayed, when the link information is determined to be the similar link information by a determining unit;

display area specifying instructions that cause at least one of said at least one processor to specify a display area for displaying existence information indicating existence of the similar link information on the basis of the specified display position;

display data generating instructions that cause at least one of said at least one processor to generate display data in which the existence information indicating existence of the similar link information is displayed in the specified display area; and transmission instructions that cause at least one of said at least one processor to transmit the display data generated by the display data generating instructions.

16. A display apparatus comprising:

at least one memory operable to store program instructions; and at least one processor operable to access said memory, read said program instructions, and operate according to said program instructions, said program instructions including:

character string storing instructions that cause at least one of said at least one processor to store a character string which is set in advance;

display data obtaining instructions that cause at least one of said at least one processor to obtain display data;

link information extracting instructions that cause at least one of said at least one processor to extract link information from the obtained display data;

partial link character string generating instructions that cause at least one of said at least one processor to generate a partial link character string including a partial character string which indicates a domain in the extracted link information, from the extracted link information;

similarity calculating instructions that cause at least one of said at least one processor to calculate similarity of the character string and the partial link character string;

similarity determining instructions that cause at least one of said at least one processor to determine whether the link information is similar link information or not on the basis of the calculated similarity;

display position specifying instructions that cause at least one of said at least one processor to specify a display position where the extracted link information is displayed, when the link information is determined to be the similar link information in the determining instructions;

display area specifying instructions that cause at least one of said at least one processor to specify a display area for displaying existence information indicating existence of the similar link information on the basis of the specified display position, existence information display instructions that cause at least one of said at least one processor to display the existence information indicating existence of the similar link information in the specified display area, and search instructions that cause at least one of said at least one processor to receive a search keyword, obtain a search result in response to the search keyword, and display the search result, wherein, the partial link character string generating instructions cause at least one of said at least one processor to generate the partial link character string, included in the search result, which indicates a domain in the link information, based on a number of characters in the character string which is set in advance, the partial link character string generating instructions cause at least one of said at least one processor to generate the partial link character string only when an accessed web page corresponding to the character string is an important web page, said determination of importance including a test of at least one of whether the web site supports encryption, supports Hyper Text Transfer Protocol over Secure Socket Layers (HTTPS), requires a password, requires authentication, and requires identification information.

17. An information processing method for an information processing apparatus for performing information processing for displaying information, the information processing method comprising:

storing a character string which is set in advance when said character string points to a website determined to have importance;

obtaining display data;

extracting link information from the obtained display data;

generating a partial link character string including a partial character string which indicates a domain in the extracted link information, from the extracted link information;

calculating similarity of the character string and the partial link character string;

determining whether the link information is similar link information or not on the basis of the calculated similarity;

specifying a display position where the extracted link information is displayed, when the link information is determined to be the similar link information in the determining step;

specifying a display area for displaying existence information indicating existence of the similar link information on the basis of the specified display position;

generating display data in which the existence information indicating existence of the similar link information is displayed in the specified display area, and receiving a search keyword, obtaining a search result in response to the search keyword, and displaying the search result, wherein, the partial link character string which indicates a domain in the link information, is generated based on a number of characters in the character string which is set in advance, and wherein the partial link character string is generated only when an accessed web page corresponding to the character string is an important web page, said determination of importance including a test of at least one of whether the website supports encryption, supports Hyper Text Transfer Protocol over Secure Socket Layers (HTTPS), requires a password, requires authentication, and requires identification information.

18. A display apparatus comprising:

at least one memory operable to store program instructions; and at least one processor operable to access said memory, read said program instructions, and operate according to said program instructions, said program instructions including:

character string storing instructions that cause at least one of said at least one processor to store a character string which is set in advance;

display data obtaining instructions that cause at least one of said at least one processor to obtain display data;

link information extracting instructions that cause at least one of said at least one processor to extract link information from the obtained display data;

partial link character string generating instructions that cause at least one of said at least one processor to generate a partial link character string including a partial character string which indicates a domain in the extracted link information, from the extracted link information, only when an accessed web page corresponding to the character string is determined to have importance, said determination of importance including a test of at least one of whether the website supports encryption, supports Hyper Text Transfer Protocol over Secure Socket Layers (HTTPS), requires a password, requires authentication, and requires identification information;

similarity calculating instructions that cause at least one of said at least one processor to calculate similarity of the character string and the partial link character string;

similarity determining instructions that cause at least one of said at least one processor to determine whether the link information is similar link information or not on the basis of the calculated similarity;

display position specifying instructions that cause at least one of said at least one processor to specify a display position where the extracted link information is displayed, when the link information is determined to be the similar link information in the determining instructions;

display area specifying instructions that cause at least one of said at least one processor to specify a display area for displaying existence information indicating existence of the similar link information on the basis of the specified display position, existence information display instructions that cause at least one of said at least one processor to display the existence information indicating existence of the similar link information in the specified display area, and search instructions that cause at least one of said at least one processor to receive a search keyword, obtain a search result in response to the search keyword, and display the search result, wherein, a similarity determining unit changes a determination criteria whether the link information is similar link information or not in accordance with a predetermined level.

19. An information processing method for an information processing apparatus for performing information processing for displaying information, the information processing method comprising:

storing a character string which is set in advance;

obtaining display data;

extracting link information from the obtained display data;

generating a partial link character string including a partial character string which indicates a domain in the extracted link information, from the extracted link information, only when an accessed web page corresponding to the character string is determined to have importance, said determination of importance including a test of at least one of whether the website supports encryption, supports Hyper Text Transfer Protocol over Secure Socket Layers (HTTPS), requires a password, requires authentication, and requires identification information;

calculating similarity of the character string and the partial link character string;

determining whether the link information is similar link information or not on the basis of the calculated similarity;

specifying a display position where the extracted link information is displayed, when the link information is determined to be the similar link information in the determining step;

specifying a display area for displaying existence information indicating existence of the similar link information on the basis of the specified display position;

generating display data in which the existence information indicating existence of the similar link information is displayed in the specified display area, and receiving a search keyword, obtaining a search result in response to the search keyword, and displaying the search result, wherein, a determination criteria whether the link information is similar link information or not is changed in accordance with a predetermined level.

* * * * *